(12) United States Patent
Sung et al.

(10) Patent No.: US 10,957,340 B2
(45) Date of Patent: Mar. 23, 2021

(54) METHOD AND APPARATUS FOR IMPROVING CALL QUALITY IN NOISE ENVIRONMENT

(71) Applicant: Samsung Electronics Co., Ltd., Suwon-si (KR)

(72) Inventors: Ho-sang Sung, Seoul (KR); Eun-mi Oh, Seoul (KR); Holly Francois, Surrey (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/492,911

(22) PCT Filed: Mar. 10, 2017

(86) PCT No.: PCT/KR2017/002621
§ 371 (c)(1),
(2) Date: Sep. 10, 2019

(87) PCT Pub. No.: WO2018/164304
PCT Pub. Date: Sep. 13, 2018

(65) Prior Publication Data
US 2020/0075038 A1 Mar. 5, 2020

(51) Int. Cl.
*G10L 25/00* (2013.01)
*G10L 25/60* (2013.01)
(Continued)

(52) U.S. Cl.
CPC .......... *G10L 25/60* (2013.01); *G10L 21/0208* (2013.01); *G10L 25/03* (2013.01); *G10L 25/78* (2013.01); *H04M 3/2236* (2013.01)

(58) Field of Classification Search
None
See application file for complete search history.

(56) References Cited

U.S. PATENT DOCUMENTS 7,092,514 B2 8/2006 Trump et al.
9,031,837 B2 * 5/2015 Homma ................. G10L 25/69
704/228

(Continued)

FOREIGN PATENT DOCUMENTS

KR 10-1176207 B1 8/2012

OTHER PUBLICATIONS

A. Hines, J. Skoglund, A. Kokaram and N. Harte, "Robustness of speech quality metrics to background noise and network degradations: Comparing ViSQOL, PESQ and POLQA," 2013 IEEE International Conference on Acoustics, Speech and Signal Processing, Vancouver, BC, 2013, pp. 3697-3701, doi: 10.1109/ICASSP (Year: 2013).*

(Continued)

*Primary Examiner* — Edgar X Guerra-Erazo

(57) ABSTRACT

A voice signal processing method according to an embodiment of the present disclosure for overcoming the problem includes: acquiring a real-time near-end noise signal; acquiring a far-end voice signal according to an incoming call; measuring subjective speech quality and perceptual-objective speech quality of test signals generated based on a reference signal and the real-time near-end noise signal; selecting at least one speech quality enhancement method based on the subjective speech quality and the perceptual-objective speech quality, and determining parameters that are to be applied to the selected at least one speech quality enhancement method; and enhancing speech quality of the far-end voice signal by using the selected at least one speech quality enhancement method, based on the determined parameters, wherein the test signals are generated by mixing the acquired real-time near-end noise signal with the reference signal whose speech quality is enhanced by applying a (Continued)

| PARAMETERS (M PARAMETERS) | VARIATION RANGE (UNIT) | SUBJECTIVE SPEECH QUALITY PREDICTION VALUE (MOS) | PERCEPTUAL-OBJECTIVE SPEECH QUALITY MEASUREMENT VALUE (NQO-NQ₀) |
|---|---|---|---|
| $P_0$ | 0~10 (2) | $S_0 = \{\cdots\}$ | $O_0 = \{\cdots\}$ |
| $P_1$ | 1~5 (1) | $S_1 = \{\cdots\}$ | $O_1 = \{\cdots\}$ |
| : | : | : | : |
| $P_{M-1}$ | 2~10 (4) | $S_{M-1} = \{\cdots\}$ | $O_{M-1} = \{\cdots\}$ | combination of parameter values to speech quality enhancement methods.

13 Claims, 20 Drawing Sheets

(51) Int. Cl.
*G10L 21/0208* (2013.01)
*G10L 25/03* (2013.01)
*G10L 25/78* (2013.01)
*H04M 3/22* (2006.01)

(56) References Cited

U.S. PATENT DOCUMENTS

| | | | |
|---|---|---|---|
| 9,558,451 B2* | 1/2017 | Nilsson | H04L 41/5067 |
| 9,633,671 B2* | 4/2017 | Giacobello | G10L 21/0208 |
| 2004/0170164 A1* | 9/2004 | Leblanc | H04L 65/607 |
| | | | 370/389 |
| 2010/0020940 A1 | 1/2010 | Zad-Issa et al. | |
| 2011/0137647 A1 | 6/2011 | Lee et al. | |
| 2011/0246192 A1* | 10/2011 | Homma | G10L 25/69 |
| | | | 704/228 |
| 2011/0300806 A1 | 12/2011 | Lindahl et al. | |
| 2014/0064507 A1 | 3/2014 | Su et al. | |
| 2014/0316773 A1* | 10/2014 | Beerends | G10L 25/60 |
| | | | 704/201 |
| 2015/0112672 A1* | 4/2015 | Giacobello | G10L 21/0208 |
| | | | 704/233 |
| 2015/0142702 A1* | 5/2015 | Nilsson | H04L 65/00 |
| | | | 706/11 |
| 2015/0310873 A1 | 10/2015 | Park | |

OTHER PUBLICATIONS

R. K. Dubey and A. Kumar, "Comparison of subjective and objective speech quality assessment for different degradation / noise conditions," 2015 International Conference on Signal Processing and Communication (ICSC), Noida, 2015, pp. 261-266, doi: 10.1109/ICSPCom.2015.7150659. (Year: 2015).*

ISA/KR, International Search Report and Written Opinion of the International Searching Authority, International Application No. PCT/KR2017/002621, dated Dec. 5, 2017, 17 pages.

* cited by examiner

FIG. 7

| | REAL-TIME PROCESSING | NEAR REAL-TIME PROCESSING |
|---|---|---|
| INPUT | - STATISTICAL INFORMATION OF REAL-TIME FAR-END VOICE SIGNAL<br>- STATISTICAL INFORMATION OF REAL-TIME NEAR-END VOICE SIGNAL<br>- TERMINAL VOLUME INFORMATION | - STORED REFERENCE VOICE SIGNAL<br>- REAL-TIME NEAR-END NOISE SIGNAL<br>- REFERENCE VOICE SIGNAL TO WHICH SPEECH QUALITY ENHANCEMENT ALGORITHM IS APPLIED (TEST VOICE SIGNAL)<br>- TERMINAL VOLUME INFORMATION |
| DETERMINATION CRITERION | OBJECTIVE SPEECH QUALITY INDEX (SNR, MSE, ...) | PERCEPTUAL-OBJECTIVE SPEECH QUALITY INDEX (MOS_LQO, MOS) |
| SIGNAL SECTION FOR DETERMINATION | FRAME/SUB-FRAME | MINIMUM OF SENTENCES FOR SPEECH QUALITY MEASUREMENT (MINIMUM OF 8 SECONDS OR MORE) |
| OUTPUT | OPTIMAL PARAMETER VALUE FOR EACH FRAME (GAIN, DEGREE OF SPECTRUM CHANGE, ETC.) | DETERMINE OPTIMAL PARAMETER IN SECTIONS WITH SAME NOISE CHARACTERISTICS (DETERMINATION CRITERION, ETC.) |
| APPLICATION PERIOD | APPLY OUTPUT IN REAL-TIME FOR EACH FRAME | APPLY WHENEVER NOISE CHARACTERISTICS CHANGE (NEAR REAL-TIME) |

FIG. 11

| PARAMETERS (M PARAMETERS) | VARIATION RANGE (UNIT) | SUBJECTIVE SPEECH QUALITY PREDICTION VALUE (MOS) | PERCEPTUAL-OBJECTIVE SPEECH QUALITY MEASUREMENT VALUE (NQO-NQ$_0$) |
|---|---|---|---|
| $P_0$ | 0~10 (2) | $S_0 = \{\cdots\}$ | $O_0 = \{\cdots\}$ |
| $P_1$ | 1~5 (1) | $S_1 = \{\cdots\}$ | $O_1 = \{\cdots\}$ |
| ⋮ | ⋮ | ⋮ | ⋮ |
| $P_{M-1}$ | 2~10 (4) | $S_{M-1} = \{\cdots\}$ | $O_{M-1} = \{\cdots\}$ |

METHOD AND APPARATUS FOR IMPROVING CALL QUALITY IN NOISE ENVIRONMENT

CROSS-REFERENCE TO RELATED APPLICATION

This application is a 371 National Stage of International Application No. PCT/KR2017/002621, filed Mar. 10, 2017, the disclosure of which is herein incorporated by reference in its entirety.

BACKGROUND

1. Field

The present disclosure relates to processing audio and/or speech signals, and more particularly, to a method and apparatus for enhancing speech quality of audio and/or speech signals in consideration of both objective speech quality and subjective speech quality, based on a noise environment around a terminal.

2. Description of Related Art

Subjective speech quality means speech quality which a listener to speech signals feels subjectively, and in a voice call system, speech articulation is an important criterion in evaluating subjective speech quality. Objective speech quality is speech quality of a voice signal or an audio signal represented using a more objective index, and is generally determined depending on a relationship between a noise signal and a voice signal or an audio signal.

However, subjective speech quality is not proportional to objective speech quality, and, objective speech quality may deteriorate even if subjective speech quality is enhanced.

Accordingly, in order to satisfy both subjective speech quality and objective speech quality, it is necessary to appropriately set parameters of a speech quality enhancement algorithm.

SUMMARY

Provided are a signal processing method and apparatus for enhancing subjective and/or objective speech quality of a decoded signal to be adaptive to a noise environment around a terminal to enhance call quality, and a computer-readable recording medium.

Representative configurations of the present disclosure for achieving the above objective are as follows.

A voice signal processing method according to an embodiment of the present disclosure for overcoming the problem includes: acquiring a real-time near-end noise signal; acquiring a far-end voice signal according to an incoming call; measuring subjective speech quality and perceptual-objective speech quality of test signals generated based on a reference signal and the real-time near-end noise signal; selecting at least one speech quality enhancement method based on the subjective speech quality and the perceptual-objective speech quality, and determining parameters that are to be applied to the selected at least one speech quality enhancement method; and enhancing speech quality of the far-end voice signal by using the selected at least one speech quality enhancement method, based on the determined parameters, wherein the test signals are generated by mixing the acquired real-time near-end noise signal with the reference signal whose speech quality is enhanced by applying a combination of parameter values to speech quality enhancement methods.

According to another embodiment of the present disclosure, the determining of the parameters may include: measuring speech quality of the test signals based on the subjective speech quality and the perceptual-objective speech quality; and determining a combination of parameter values when the measured speech quality of the test signals is optimal, as the parameters.

According to another embodiment of the present disclosure, the determining of the parameters may further include determining a weight for the subjective speech quality and a weight for the perceptual-objective speech quality based on context information for the incoming call, wherein the speech quality of the test signals may be measured by applying the weight for the subjective speech quality to the subjective speech quality and applying the weight for the perceptual-objective speech quality to objective speech quality.

According to another embodiment of the present disclosure, the subjective speech quality may be measured based on subjective speech quality prediction values corresponding to the parameter values.

According to another embodiment of the present disclosure, the voice signal processing method may further include: monitoring the real-time near-end noise signal; and updating the parameters when the monitored result indicates that characteristics of the real-time near-end noise signal change.

A voice signal processing method according to another embodiment of the present disclosure for overcoming the problem includes: acquiring a real-time near-end noise signal; acquiring a far-end voice signal according to an incoming call; transmitting information about the acquired real-time near-end noise signal; receiving information about at least one speech quality enhancement method selected based on subjective speech quality and perceptual-objective speech quality of test signals generated based on a reference signal and the real-time near-end noise signal, and information about optimal values of parameters that are to be applied to the selected at least one speech quality enhancement method; and enhancing speech quality of the near-end voice signal by using the selected at least one speech quality enhancement method, based on the received optimal values of the parameters, wherein the test signals are generated by mixing the acquired real-time near-end noise signal with the reference signal whose speech quality is enhanced by applying a combination of parameter values to speech quality enhancement methods.

According to another embodiment of the present disclosure, the far-end voice signal may be a voice signal whose speech quality is enhanced by applying optimal values of parameters determined based on a reference signal and a real-time far-end noise signal to at least one speech quality enhancement method.

A voice signal processing apparatus according to an embodiment of the present disclosure for overcoming the problem includes: an inputter configured to acquire a real-time near-end noise signal; a receiver configured to acquire a far-end voice signal according to an incoming call; and a speech quality enhancer configured to measure subjective speech quality and perceptual-objective speech quality of test signals generated based on a reference signal and the real-time near-end noise signal, to select at least one speech quality enhancement method based on the subjective speech quality and the perceptual-objective speech quality, to determine parameters that are to be applied to the selected at least one speech quality enhancement method, and to enhance speech quality of the far-end voice signal by using the selected at least one speech quality enhancement method, based on the determined parameters, wherein the test signals are generated by mixing the acquired real-time near-end noise signal with the reference signal whose speech quality is enhanced by applying a combination of parameter values to speech quality enhancement methods.

A voice signal processing apparatus according to another embodiment of the present disclosure for overcoming the problem includes: an inputter configured to acquire a real-time near-end noise signal; a transceiver configured to acquire a far-end voice signal according to an incoming call, to transmit information about the acquired real-time far-end noise signal, and to receive information about at least one speech quality enhancement method selected based on subjective speech quality and perceptual-objective speech quality of test signals generated based on a reference signal and the real-time near-end noise signal, and parameters that are to be applied to the selected at least one speech quality enhancement method; and a speech quality enhancer configured to enhance speech quality of the far-end voice signal by using the selected at least one speech quality enhancement method, based on the received parameters, wherein the test signals are generated by mixing the acquired real-time near-end noise signal with the reference signal whose speech quality is enhanced by applying a combination of parameter values to speech quality enhancement methods.

Meanwhile, according to an embodiment of the present disclosure, a computer-readable recording medium storing a program for executing the above-described method is provided.

In addition, another method, another system, and a computer-readable recording medium storing a computer program for executing the method for implementing the present disclosure are further provided.

According to the present disclosure, call quality may be enhanced to be adaptive to a noise environment around a terminal. By setting optimal parameters for speech quality enhancement in consideration of objective speech quality evaluation and subjective speech quality evaluation, call quality may be enhanced.

Also, when a call quality enhancement method and optimal parameters are determined by a server, a higher effect of speech quality enhancement may be obtained.

BRIEF DESCRIPTION OF DRAWINGS

FIG. 7 shows main information of a speech quality enhancement method according to an embodiment of the present disclosure.

FIG. 11 shows a table of speech quality evaluation results for parameters, according to an embodiment of the present disclosure.

DETAILED DESCRIPTION

Figure 1:
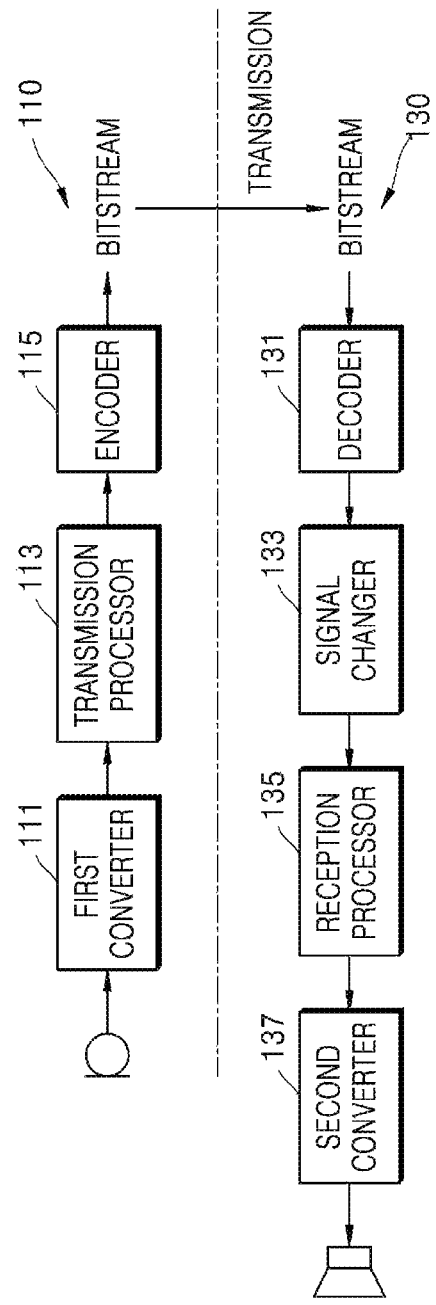
FIG. 1 is a block diagram showing a configuration of a mobile communication apparatus for voice calls, according to an embodiment of the present disclosure.

Representative configurations of the present disclosure for achieving the above-described purposes are as follows.

A voice signal processing method according to an embodiment of the present disclosure for overcoming the problem includes: acquiring a real-time near-end noise signal; acquiring a far-end voice signal according to an incoming call; measuring subjective speech quality, and perceptual-objective speech quality of test signals generated based on a reference signal and the real-time near-end noise signal; selecting at least one speech quality enhancement method based on the subjective speech quality and the perceptual-objective speech quality, and determining parameters that are to be applied to the selected at least one speech quality enhancement method; and enhancing speech quality of the far-end voice signal by using the selected at least one speech quality enhancement method, based on the determined parameters, wherein the test signals are generated by mixing the acquired real-time near-end noise signal with the reference signal whose speech quality is enhanced by applying a combination of parameter values to speech quality enhancement methods.

Detailed descriptions of the present disclosure described below will be given with reference to the accompanying drawings which illustrate specific exemplary embodiments in which the present disclosure may be implemented. The exemplary embodiments will be described in sufficient detail for those skilled in the art to implement the present disclosure. Various exemplary embodiments of the present disclosure are different from each other, but it should be understood that the exemplary embodiments does not need to be mutually exclusive.

For example, specific shapes, structures, and properties as described herein may be implemented in other exemplary embodiments without departing from the spirit and scope of the present disclosure in connection with an exemplary embodiment. Further, it should be understood that positions or arrangements of individual components within disclosed exemplary embodiments may be changed without departing from the spirit and scope of the present disclosure. Therefore, detailed description below is not intended to be taken as limited meanings, and the scope of the present disclosure includes the scope of the claims and their equivalents.

In the drawings, similar reference numerals represent like or similar components over several aspects. Also, for definite descriptions of the present disclosure, parts irrelevant to descriptions are not shown in the drawings, and throughout the specification, similar components are assigned similar reference numerals.

Hereinafter, embodiments of the present disclosure will be described in detail with reference to the appended drawings in order for one of ordinary skill in the art to easily-embody the present disclosure. However, the present disclosure can be implemented in various different forms, and is not limited to the embodiments described herein.

In this specification, it will be understood that the case in which a certain part is "connected" to another part includes the case in which the part is "electrically connected" to the other part with another device in between, as well as the case in which the part is "directly connected" to the other part. Also, it will be understood that when a certain part "includes" a certain component, the part does not exclude another component but can further include another component, unless the context clearly dictates otherwise.

Hereinafter, the present disclosure will be described in detail with reference to the accompanying drawings.

FIG. 1 is a block diagram showing a configuration of a mobile communication apparatus for voice calls according to an embodiment of the present disclosure.

The apparatus shown in FIG. 1 may include a far-end terminal 110 and a near-end terminal 130. The far-end terminal 110 may include a first converter 111, a transmission processor 113, and an encoder 115. The near-end terminal 130 may include a decoder 131, a signal changer 133, a reception processor 135, and a second converter 137. In the present specification, a transmitting-end terminal is used as the same meaning as a far-end terminal and a receiving-end device is used as the same meaning as a near-end terminal.

In the far-end terminal 110 and/or the near-end terminal 130, individual components may be integrated into at least one processor, except for cases in which they need to be implemented as separate hardware. The far-end terminal 110 and the near-end terminal 130 may be respectively installed in a transmitter and a receiver of user equipment.

In FIG. 1, the first converter 111 may convert an analog signal provided through an inputter such as a microphone into a digital signal.

The transmission processor 113 may perform various signal processing on the digital signal provided from the first converter 111. Examples of the signal processing may be noise removal, echo reduction, etc., although not limited thereto.

The encoder 115 may encode the signal provided from the transmission processor 113 by using a predetermined codec. A bitstream generated as the encoded result may be transmitted to a receiver through a transmission channel or stored in a storage medium to be used for decoding.

Meanwhile, the decoder 131 may decode the received bitstream by using a predetermined codec.

The signal changer 133 may change the decoded signal in correspondence to a reception environment according to an environmental noise signal of the near-end terminal 130. The signal changer 133 may change the decoded signal in correspondence to a reception environment, in response to terminal state information, such as a volume level and a user input related to volume adjustment. According to an embodiment, the signal changer 133 may determine a band class related to articulation enhancement for each band of a noise signal and a voice signal, generate guide information for articulation enhancement based on the determined band class of the noise signal and the determined band class of the voice signal, and apply the guide information to the voice signal to generate a changed voice signal. According to another embodiment, the signal changer 133 may determine a class related to articulation enhancement of a voice signal for each of a noise signal and the voice signal, generate guide information for articulation enhancement based on the determined class and a voice articulation model modeled from a voice signal of a clean environment and the voice signal changed in a noise environment, and apply the guide information to the voice signal to generate a changed voice signal.

The reception processor 135 may perform various signal processing on the signal provided from the signal changer 133. Examples of the signal processing may be noise removal, echo reduction, etc., although not limited thereto.

The second converter 137 may convert the signal provided from the reception processor 135 into an analog signal. The analog signal provided from the second converter 137 may be reproduced through a speaker or a receiver.

An example of the codec used in FIG. 1 may be an EVS.

Figure 2:
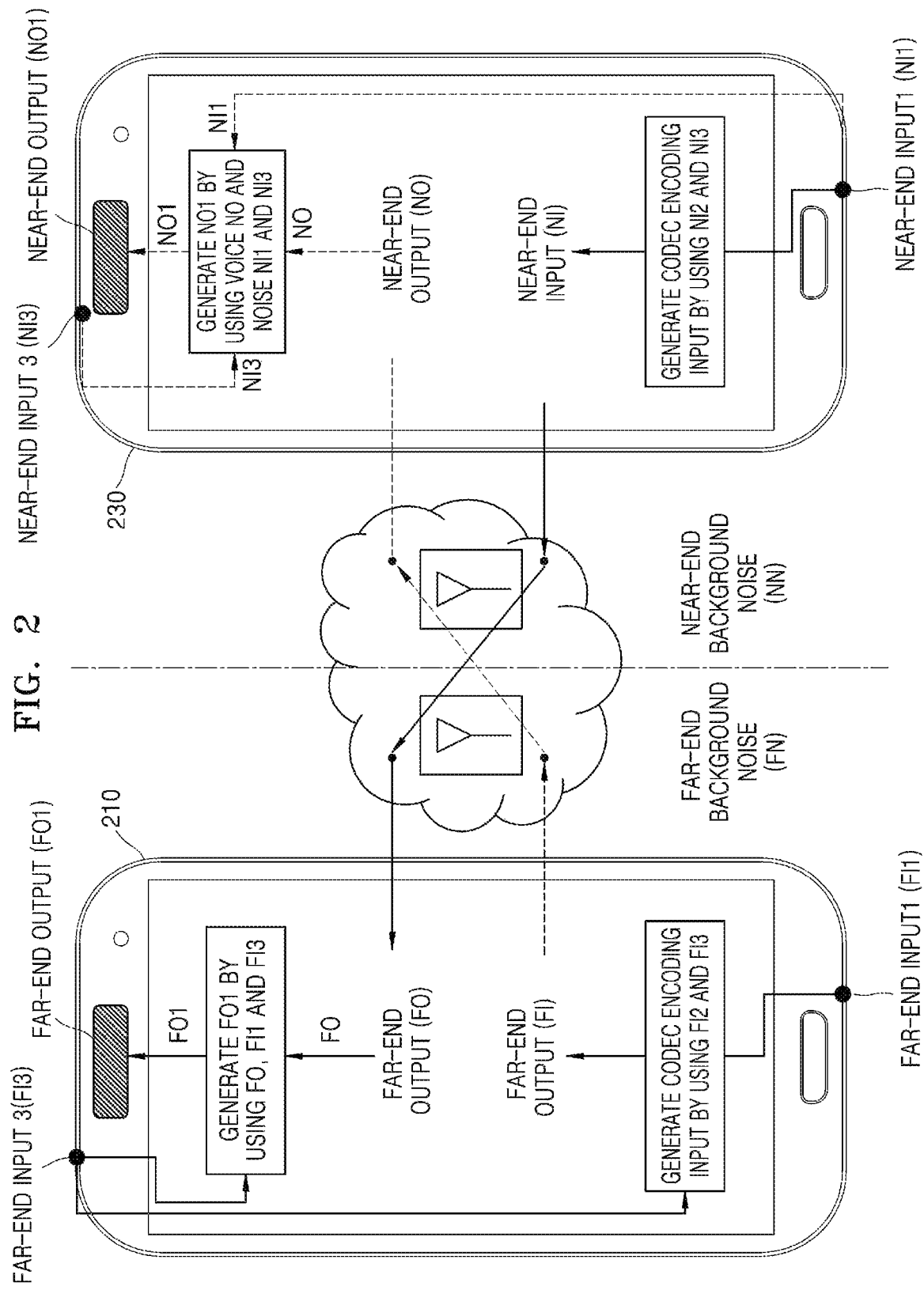
FIG. 2 is a view for describing signals for generating far-end inputs/outputs and near-end inputs/outputs, according to an embodiment of the present disclosure.

FIG. 2 is a view for describing signals for generating far-end inputs/outputs and near-end inputs/outputs in a far-end terminal 210 and a near-end terminal 230 according to an embodiment of the present disclosure. FIG. 2 shows an example in which two microphones are installed in a terminal. According to the example, for noise control and articulation enhancement, noise NI1 from a first microphone located at a lower end or at a front or rear side of the lower end and noise NI3 from a third microphone located at an upper end or at a front or rear side of the upper end may be used.

An output NO of the near-end terminal 230 may be a signal received by the near-end terminal 230 and corresponding to a far-end input voice signal FI transferred to the near-end terminal 230 through a network. By using the near-end noise NI1 and NI3 received through the microphones of the near-end terminal, a final output signal NO1 may be generated.

FIG. 2 relates to an example in which two microphones are installed in each terminal, however, a signal processor according to an embodiments not limited by the number and/or positions of microphones.

Figure 3:
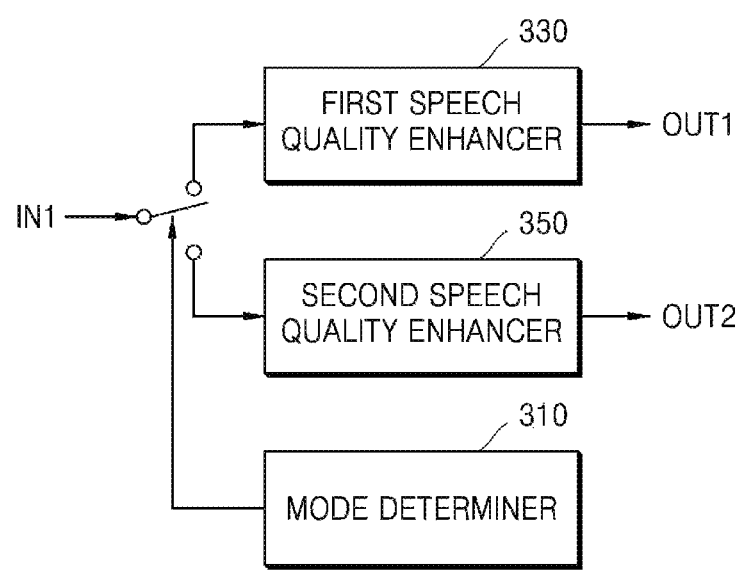
FIG. 3 is a block diagram showing a configuration of a signal processing apparatus according to an embodiment of the present disclosure.

FIG. 3 is a block diagram showing a configuration of a signal processing apparatus according to an embodiment of the present disclosure. The signal processing apparatus may correspond to the signal changer 133 of FIG. 1.

The apparatus shown in FIG. 3 may include a mode determiner 310, a first speech quality enhancer 330, and a second speech quality enhancer 350. The first speech quality enhancer 330 and the second speech quality enhancer 350 may apply a speech quality enhancement algorithm according to each speech quality enhancement mode to enhance subjective speech quality and objective speech quality. Details about subjective speech quality and objective speech quality will be described later. The mode determiner 310 may determine a speech quality enhancement mode based on environment information, context information or noise information of the signal processing apparatus.

According to an embodiment, the mode determiner 310 and the second speech quality enhancer 350 may be optionally provided. In this case, the signal processing apparatus may be implemented as the first speech quality enhancer 330.

According to an embodiment, when a received volume reaches a maximum setting value, the mode determiner 310 may determine whether a volume-up input is additionally received from a user to determine one of a first mode and a second mode. According to another embodiment, when a disaster broadcast is received or when an emergency such as a 119 call is sensed, the mode determiner 310 may determine the second mode. Herein, the first mode may be referred to as a basis mode, and the second mode may be referred to as an aggressive mode. According to an embodiment, the first mode may be set to a default.

According to another embodiment, the mode determiner 310 may determine one of the first mode or the second mode, based on a feature of a noise signal or context information about a call negotiation state, wherein the first mode is referred to as a subjective speech quality enhancement mode and the second mode is referred to as an objective speech quality enhancement mode.

According to another embodiment, the mode determiner 310 may determine that both the first mode or the second mode need to operate, and in this case, the mode determiner 310 may determine an output of the first mode and an output of the second mode such that total output power is maintained.

According to another embodiment, the signal processing apparatus may include three speech quality enhancers, and details about a speech quality enhancement method and operations of the speech quality enhancers will be described later.

Figure 4:
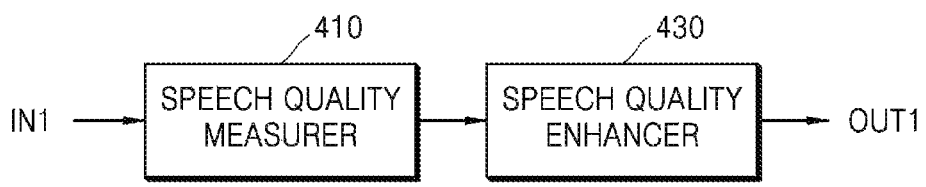
FIG. 4 is a block diagram showing a configuration of a signal processing apparatus according to an embodiment of the present disclosure.

FIG. 4 is a block diagram showing a configuration of a signal processing apparatus according to another embodiment of the present disclosure, and the signal processing apparatus may correspond to the signal changer 133 of FIG. 1.

The apparatus shown in FIG. 4 may include a speech quality measurer 410 and a speech quality enhancer 430. The speech quality enhancer 430 may enhance speech quality of a received far-end voice signal based on a speech quality index measured by the speech quality measurer 410. The speech quality enhancer 430 may be implemented as shown in FIG. 3.

Because evaluation on speech quality show different results depending on surrounding environments and a listener's experiences, it may be difficult to quantitatively measure speech quality. Speech quality may be classified into subjective speech quality and objective speech quality according to an evaluation method.

Subjective speech quality means speech quality which a listener hearing a voice signal feels subjectively, and in a voice call system, speech articulation is important criterion in evaluating subjective speech quality. Speech articulation may be determined largely depending on a degree of noise and how close a voice is to a speaker's original voice.

Because a human can recognize a predetermined level of noise or higher, can distinguish a voice from noise, and can remember the other party's voice that he/she has usually heard, he/she can recognize how different a call voice is from a speaker's original voice and compare the call voice with the speaker's original voice. That is, a speaker's voice which a user has usually heard becomes a reference voice, and a voice being heard during a voice call becomes a comparison target, so that the user can evaluate speech quality emotionally/subjectively.

A method of quantitatively measuring speech quality may also be similar to that described above, and may be configured with processes as follows.

1) An evaluator hears a reference voice of a voice to be tested.

2) The evaluator hears a degraded voice mixed with noise, etc.

3) The evaluator gives a score of 1 to 5 according to how similar the degraded voice is to the reference voice.

A measuring method in which a human gives a score emotionally is referred to as subjective speech quality measurement, and a result of subjective speech quality evaluation may be expressed as a mean opinion score (MOS) index.

The subjective speech quality measurement has high reliability because it reflects many people's evaluations on an actual voice signal. However, the subjective speech quality measurement requires high cost, and has difficulties that it needs repeated tests. Also, the results of speech quality evaluations depend on environments and tendencies of participants participating in the evaluations, and the reliability of the speech quality measurement results is determined depending on the number of the participants.

An objective speech quality evaluation index that has typically been used is D-Value, which is determined by comparing signal sensitivity with noise sensitivity. However, noise sensitivity is not directly related to a noise level, that is, a noise size, and in a non-linear system, it will be difficult to properly perform a speech quality evaluation because noise sensitivity does not appear linearly. Also, when a noise removal technique is applied using such wrong results of speech quality evaluation, a significant deterioration of signal quality may be caused.

To overcome the problem, a perceptual-objective speech quality measurement method capable of predicting MOS values evaluated by a human has been developed, and as international standards widely used, there are perceptual speech quality measure (PSQM), perceptual evaluation of audio quality (PEAQ), perceptual evaluation of speech quality (PESQ), single sided speech quality measure (3SQM), perceptual evaluation of video quality (PEVQ), 3-fold quality evaluation of speech in telecommunication (3QUEST), and perceptual objective listening quality assessment (POLQA) algorithms.

The 3QUEST which is an ETSI standard is an objective speech quality evaluation technique that can be applied to both wide-band transmission and narrow-band transmission environments in a noise environment, and the 3QUEST reflects database of subjective S-MOS, N-MOS, and G-MOS to deduce objective S-MOS, N-MOS, and G-MOS which are objective speech quality evaluation indices.

The POLQA which is a most representative one of perceptual-objective speech quality measurement methods has been developed in consideration of transmission characteristics of HD-Voice, 3G/4G/LTE and VoIP and extension of a voice frequency bandwidth, and the POLQA sets a MOS reference value of 4.8 for a super-wide band voice signal, a MOS reference value of 4.5 for a wide band voice signal, and a MOS reference value of 3.8 for PCM according to frequency bandwidths without using MOS values as in the PESQ. The POLQA algorithm supports two modes of a narrowband transmission mode and a super-wide band transmission mode.

The POLQA algorithm compares a reference signal with a test signal resulting from degrading the speech quality of the reference signal to measure perceptual-objective speech quality, and as the measured result, a mean opinion score-listening quality objective (MOS-LQO) value is obtained.

Figure 5:
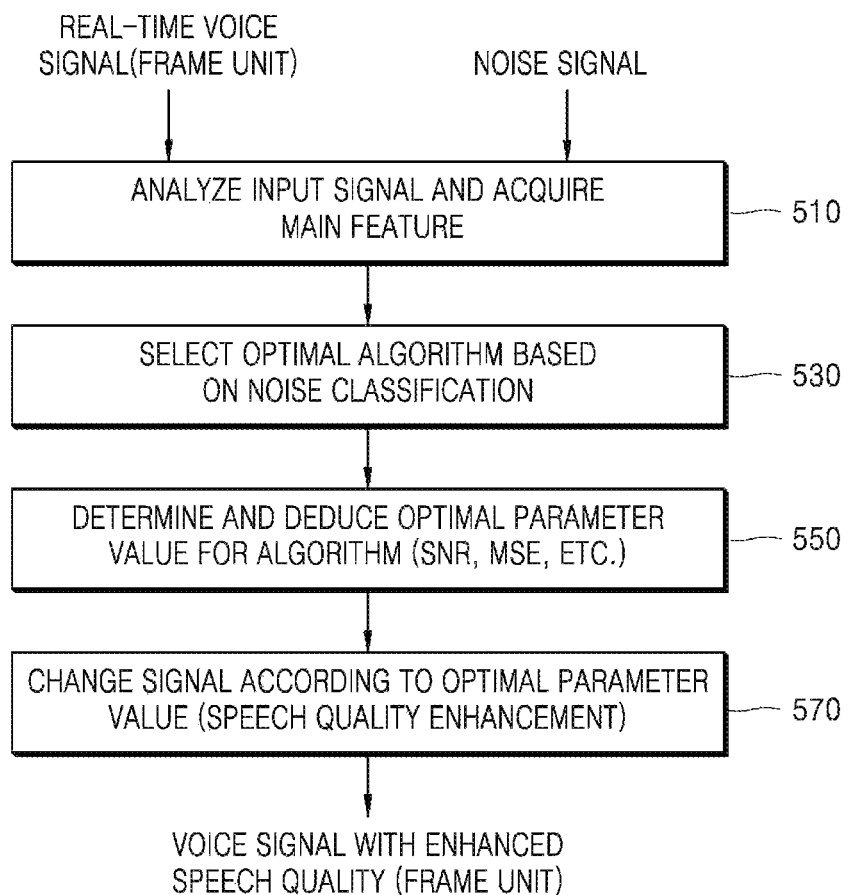
FIG. 5 is a flowchart of a signal processing method according to an embodiment of the present disclosure.

FIG. 5 is a flowchart of a signal processing method according to an embodiment of the present disclosure.

In the embodiment shown in FIG. 5, speech quality of a real-time far-end voice signal may be enhanced in unit of a frame by using statistical information of a real-time noise signal.

When a real-time far-end voice signal and a near-end noise signal are acquired, the voice signal and the noise signal may be analysed in unit of a frame to obtain a main feature, in operation 510. To analyse the input signals and acquire the feature, statistical information of the real-time far-end voice signal and statistical information of the real-time near-end noise signal may be used.

The noise signal may be classified based on the statistical information for the noise signal, and an optimal speech quality enhancement algorithm may be selected based on the noise classification, in operation 530.

After the optimal speech quality enhancement algorithm is selected, an optimal parameter for the selected algorithm may be determined, in operation 550. When the selected speech quality enhancement algorithm is used, a parameter value for which objective speech quality, such as a signal to noise ratio (SNR) of a voice signal and a noise signal or a mean square error (MSE) of a voice signal and a voice signal with noise, is highest may be determined as an optimal parameter value.

When an optimal speech quality enhancement parameter for each frame is determined, the voice signal may change based on the selected algorithm and the determined parameter, in operation 570, so that a voice signal whose speech quality has been enhanced in unit of a frame may be acquired.

A result of speech quality evaluation may change depending on a noise environment. For example, noise environments, such as whether a kind of noise around a user is white noise or pink noise, whether a user is outdoor or indoor, etc., may influence a result of speech quality prediction and a result of speech quality enhancement according to each algorithm.

A process of classifying a noise signal may be performed to match the noise signal with one of representative noise signals based on statistical information about noise signals and use a statistical feature of the matched noise signal. The noise signal may be classified according to kinds of the representative noise signals. When the acquired real-time near-end noise signal is exactly identical to a kind of a representative noise signal and classification is correctly performed, it may be possible to enhance objective speech quality by selecting an optimal speech quality enhancement algorithm and determining an optimal parameter. However, when the acquired near-end noise signal does not correspond to any kind of the representative noise signals or when classification of a noise kind is wrongly performed, it may be impossible to obtain optimal objective speech quality enhancement performance.

Also, because whether the meaning of a voice signal is properly transferred is an important factor in evaluating subjective speech quality or perceptual-objective speech quality, a speech quality evaluation may be performed in unit of a sentence, instead of in unit of a frame, and a reference signal of a minimum of 8 seconds or more may be used. Accordingly, the above-described method of enhancing speech quality in unit of a frame cannot enhance speech quality using subjective or perceptual-objective speech quality measurement results.

Also, when a plurality of speech quality enhancement parameters can be set, values of the parameters may be determined independently without considering how speech quality is determined according to combinations of the parameter values.

Figure 6:
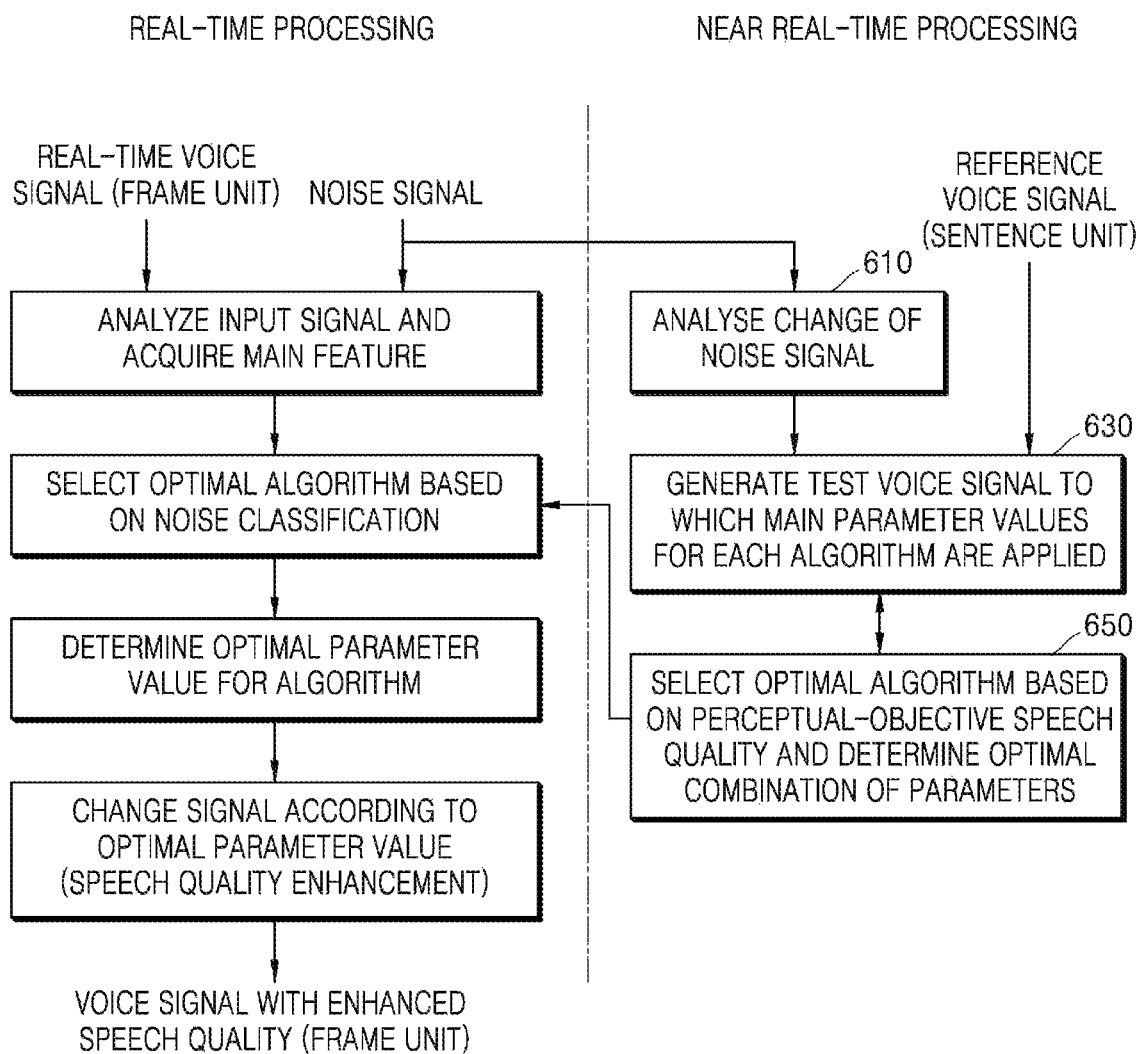
FIG. 6 is a flowchart of a signal processing method according to another embodiment of the present disclosure.

FIG. 6 is a flowchart of a signal processing method according to another embodiment of the present disclosure.

In the embodiment disclosed in FIG. 6, by using a real-time voice signal in unit of a frame and statistical information of a real-time noise signal to measure objective speech quality in real-time, the speech quality of the voice signal may be enhanced in real-time, and simultaneously, by using a reference voice signal in unit of a sentence and a real-time noise signal to measure perceptual-objective speech quality in near real-time, the speech quality of a far-end voice signal may be enhanced in near real-time.

The process of enhancing the speech quality of the voice signal in real-time by using the real-time voice signal in unit of a frame and the statistical information of the real-time noise signal to measure objective speech quality in real-time is the same process as disclosed in FIG. 5, and therefore, detailed descriptions thereof will be omitted.

To maintain a pre-set parameter in sections with the same noise characteristics and newly set a parameter when the noise characteristics change, when a real-time noise signal is acquired, a change of the real-time noise signal may be analysed, in operation 610.

The real-time noise signal means a noise signal received through a microphone of a terminal, and a noise level, a frequency spectrum shape, and information about a temporal variation may be used. That is, real-time characteristics, instead of statistical characteristics according to classification of a noise signal, may be used.

When an analysis result of a change of the real-time noise signal indicates that characteristics of the real-time noise signal changes, a test voice signal may be generated according to a combination of parameter values for each algorithm based on information about the real-time noise signal and the reference voice signal, in operation 630.

The reference voice signal, which is a voice signal stored in advance for measuring perceptual-objective speech quality, may be a predefined voice signal for speech quality measurement, a caller's voice or a listener's voice. The test voice signal may be obtained by mixing the real-time noise signal with the reference voice signal to which a speech quality enhancement algorithm for a combination of parameter values has been applied.

After the test voice signal is generated, the test voice signal may be compared with the reference voice signal to measure perceptual-objective speech quality, an algorithm for obtaining optimal speech quality may be selected based on the measured perceptual-objective speech quality, and an optimal combination of parameters may be determined.

The reference voice signal and the test voice signal may be pre-stored voice signals, and correspond to frames that are irrelevant frames being currently processed. Also, because it does not need to wait an input of a voice signal in unit of a sentence and real-time characteristics of a noise signal are used, perceptual-objective speech quality may be measured in near real-time, and speech quality enhancement parameters may be determined in near real-time.

After the optimal algorithm is selected and the optimal combination of parameters is determined, the voice signal may change based on the selected optimal algorithm and the optimal combination of parameters so that speech quality of the voice signal may be enhanced.

FIG. 7 shows main information of a speech quality enhancement method according to an embodiment of the present disclosure.

A real-time processing method using objective speech quality may measure an objective speech quality index in unit of a frame or a sub-frame of an input signal by using statistical information of a real-time far-end voice signal, statistical information of a real-time near-end noise signal, and terminal volume information, determine an optimal speech quality enhancement parameter for each frame based on the measured objective speech quality index, and update the parameter every frame in real-time.

A near real-time processing method using perceptual-objective speech quality may measure a perceptual-objective speech quality index of an input signal in unit of a minimum sentence for speech quality measurement by using a pre-stored reference voice signal, a real-time near-end noise signal, a test voice signal, and terminal volume information, determine an optimal speech quality enhancement parameter in sections with the same noise characteristics based on the measured perceptual-objective speech quality index, and update the optimal speech quality enhancement parameter whenever the noise characteristics change.

FIG. 8 shows speech quality for individual parameter values in a noise environment.

Figure 8A:
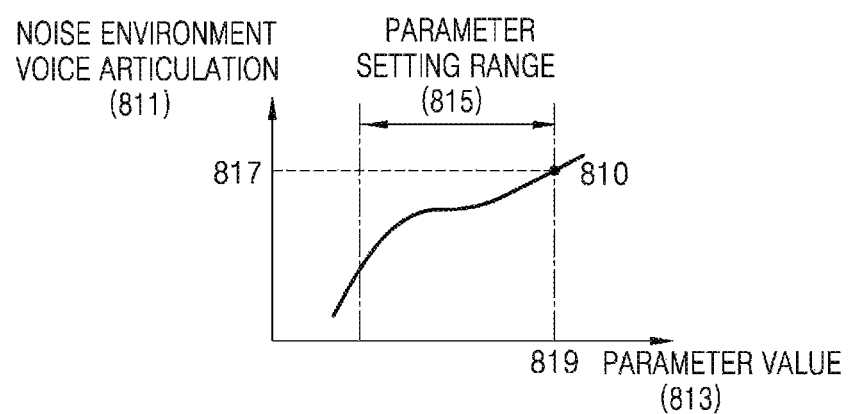
FIG. 8A shows a subjective speech quality prediction value according to an arbitrary parameter value in a noise environment.

FIG. 8A shows a subjective speech quality prediction value according to an arbitrary parameter value in a noise environment.

A subjective speech quality prediction value means a predicted result of speech quality which a listener hearing a voice signal feels subjectively, and in a voice call system, speech articulation is important criterion in predicting subjective speech quality.

Accordingly, a horizontal axis of FIG. 8A means values 813 that can be set for an arbitrary parameter, and a vertical axis of FIG. 8A means speech articulation 811 for each index, that is, a subjective speech quality prediction value. When a setting range of parameter values for subjective speech quality prediction values is a range 815, an optimal subjective speech quality enhancement parameter value for obtaining a greatest subjective speech quality prediction value 817 may be determined as a parameter value 819.

When the number of parameters that can be set is NI, a speech quality graph for each of the M parameters may exist, and each of the NI parameters may be determined independently.

Figure 8B:
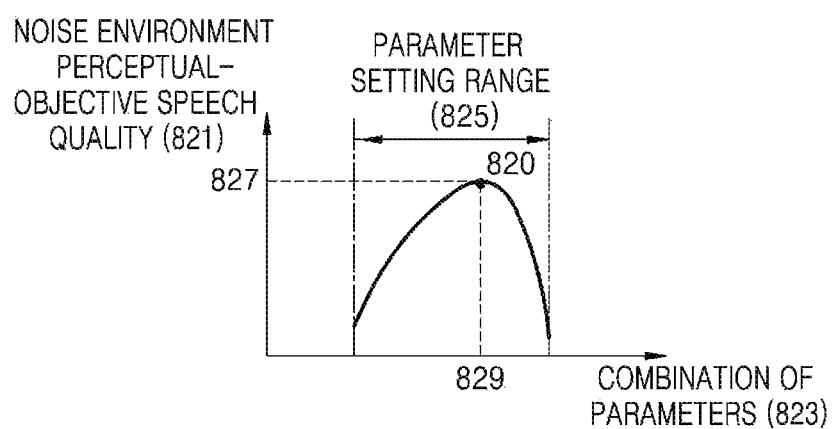
FIG. 8B shows perceptual-objective speech quality for combinations of parameters in a noise environment.

FIG. 8B shows perceptual-objective speech quality measurement values for combinations of parameters in a noise environment.

A perceptual-objective speech quality measurement value in a noise environment may be determined by a plurality of parameters, and in this case, an optimal value of the parameters may be determined based on a relationship between combinations of the plurality of parameters and speech quality. When the number of parameters that can be set is M and the number of values that each parameter can have is N, the number of cases for combinations of parameters may be N*M.

A horizontal axis of FIG. 8B means indices 823 for combinations of parameter values, and a vertical axis of FIG. 8B means perceptual-objective speech quality measurement values 821 for the indices. When a parameter setting range for objective speech quality measurement values is a range 825, an optimal combination of subjective speech quality enhancement parameter values for obtaining a greatest objective speech quality measurement value 827 may be determined as a parameter combination 829.

As shown in FIGS. 8A and 8B, subjective speech quality and objective speech quality may show different aspects, and objective speech quality may deteriorate although subjective speech quality is enhanced. That is, when articulation of a voice signal is enhanced through algorithm tuning in a noise environment, excessively enhancing the articulation may cause a deterioration of objective speech quality or perceptual-objective speech quality. Accordingly, to satisfy both subjective speech quality and objective speech quality, it may be necessary to properly set parameters of a speech quality enhancement algorithm.

Figure 8C:
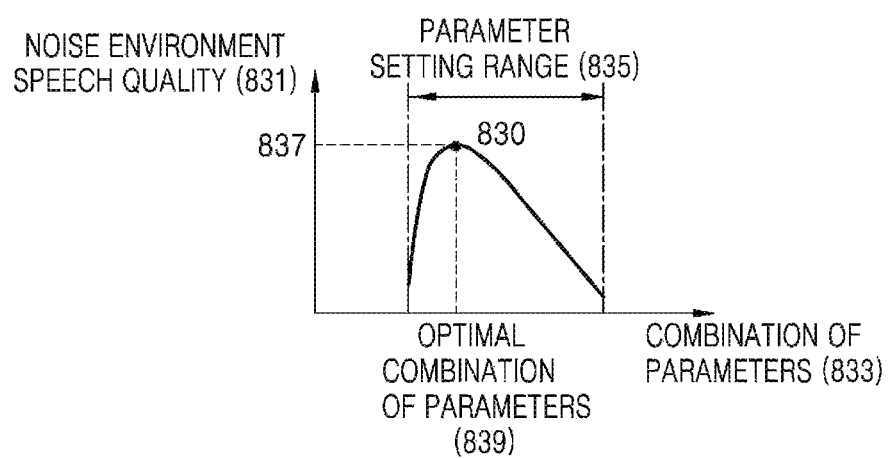
FIG. 8C shows optimal speech quality for a combination of parameters in a noise environment.

FIG. 8C shows optimal speech quality for combinations of parameters in a noise environment.

A horizontal axis of FIG. 8C means indices 833 for combinations of parameter values, and a vertical axis of FIG. 8C means speech quality 821 for the indices. The speech quality may correspond to speech quality considering both subjective speech quality and perceptual-objective speech quality. A method of evaluating speech quality in consideration of both subjective speech quality and perceptual-objective speech quality will be described later.

When a parameter setting range for subjective and perceptual-objective speech quality is a range 835, an optimal combination of speech quality enhancement parameter values for obtaining optimal speech quality 837 may be determined as a parameter combination 839.

Figure 9:
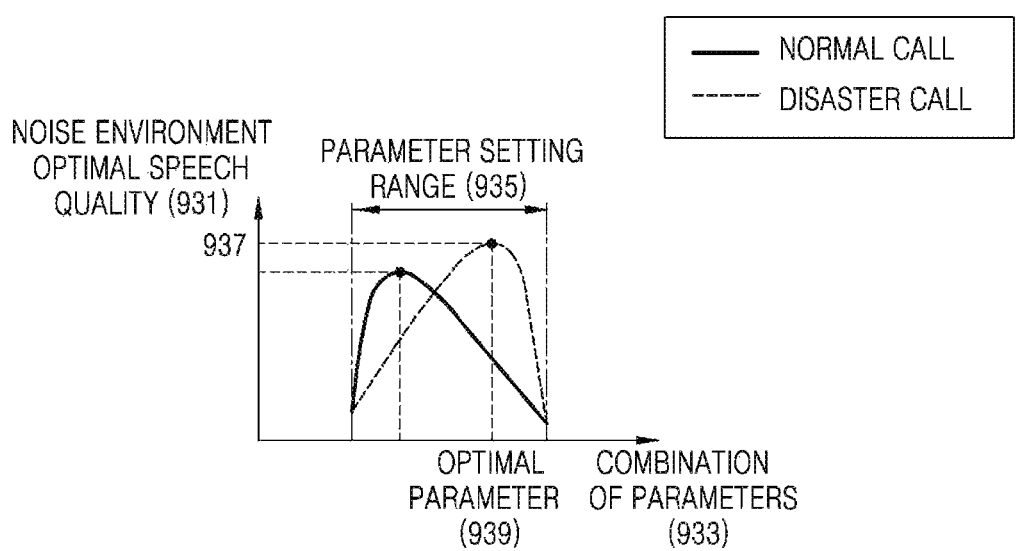
FIG. 9 shows speech quality for combinations of parameters depending on call situations, according to an embodiment of the present disclosure.

FIG. 9 shows speech quality for combinations of parameters depending on call situations according to an embodiment of the present disclosure.

FIG. 8C shows speech quality according to each combination of parameters in a general call situation, wherein an optimal combination of speech quality enhancement parameter values for obtaining optimal speech quality 837 is determined as a parameter combination 839. However, when an emergency call or a disaster call is made, subjective speech quality, that is, voice articulation is a more important factor in call quality, rather than objective speech quality. Accordingly, by adjusting weights of subjective speech quality and perceptual-objective speech quality to enhance articulation, an optimal combination of optimal parameters for optimal speech quality 937 for a disaster call situation may be determined as a parameter combination 939.

As such, by using context information about a call, additional speech quality enhancement may be possible.

Context information about a call according to an embodiment of the present disclosure may include computing context information, user context information, physical context information, and temporal context information.

The computing context information may include information about a kind or state of a network used for a call between terminals, information about whether an emergency call or a disaster call is made, information about an available bandwidth and a terminal, etc. As described above, when an emergency call is made, importance of articulation is high, and therefore, by applying a higher weight to subjective speech quality prediction information, it may be necessary to increase articulation rather than objective speech quality. The user context information may include a user's terminal setting information, a user's position, information about call records, information about a user's feedback after a call is made, etc.

The physical context information may include information about speaker positions and shapes of a terminal, information about whether a signal being a speech quality enhancement target is a mono signal or a stereo signal, information about a noise level, etc. Generally, importance of articulation may become higher at a longer distance between a speaker and an ear and at a smaller volume of the speaker. The temporal context information may include information about a time at which the corresponding call is made.

According to another embodiment, whether a signal being a speech quality enhancement target is a signal that is used for a virtual reality (VR) service, an aggressive reality (AR) service, or a mixed reality (MR) service may be used as context information. For example, by setting a speech quality enhancement algorithm and parameters based on noise information around a service providing terminal for a voice signal or an audio signal transmitted from a server for providing a VR service or an AR service, a speech quality enhancement method according to the present disclosure may be applied.

Figure 10:
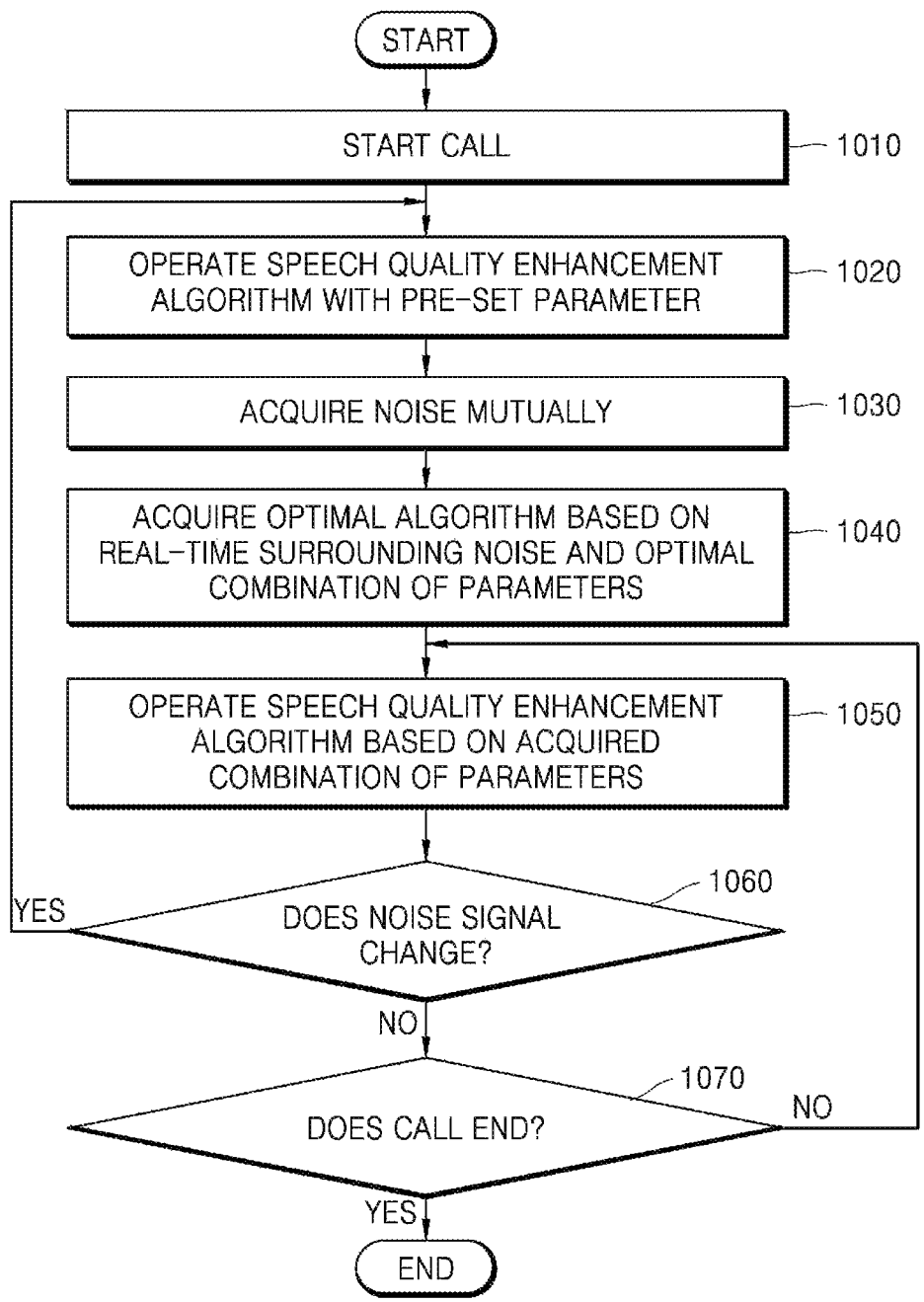
FIG. 10 is a flowchart of a signal processing method according to an embodiment of the present disclosure.

FIG. 10 is a flowchart of a signal processing method according to an embodiment of the present disclosure.

When a call negotiation between a far-end terminal and a near-end terminal is completed and a call starts in operation 1010, speech quality of a received far-end voice signal may be enhanced based on parameters pre-set in a speech quality enhancement algorithm, in operation 1020. In this case, the pre-set parameters may be parameters determined for a previous call environment, and according to another embodiment, the pre-set parameters may be pre-set parameters set to be applied when a call starts.

When a real-time near-end noise signal is acquired in operation 1030, an optimal combination of speech quality enhancement parameters may be determined based on speech quality measurement of a test signal generated based on the acquired real-time near-end noise signal, in operation 1040, and the optimal combination of speech quality enhancement parameters may be applied to the speech quality enhancement algorithm so that the speech quality of the received far-end voice signal may be enhanced, in operation 1050.

A voice signal processing apparatus according to an embodiment of the present disclosure may monitor a change of a noise signal, in operation 1060, and when the monitored result indicates that characteristics of the noise signal change, an optimal speech quality enhancement parameter may be newly determined by using the changed real-time noise signal. The process may be repeated until the call ends, in operation 1070.

FIG. 10 shows a flowchart for a method of predicting subjective speech quality in unit of a sentence and measuring perceptual-objective speech quality using a pre-stored reference signal and real-time noise to thereby enhance speech quality of a voice signal in near real-time. However, the method may be performed in parallel to the method of measuring objective speech quality in unit of a frame to enhance speech quality in real time, as shown in FIG. 8.

FIG. 11 shows a table of speech quality evaluation results for parameters according to an embodiment of the present disclosure.

A first column of a speech quality evaluation table shown in FIG. 11 represents parameter indices, a second column of the speech quality evaluation table represents variation ranges for parameters and a unit of each value, a third column of the speech quality evaluation table represents subjective speech quality prediction values (MOS) for values, and a fourth column of the speech quality evaluation table represents perceptual-objective speech quality measurement values (MOS-NQO).

In the embodiment disclosed in FIG. 11, the number of speech quality enhancement parameters may be M, and indices for the parameters may be $P_0, P_1, \ldots, P_{M-1}$.

The first parameter $P_0$ may have values of 0 to 10, and a unit of each value may be 2. Therefore, values that the parameter $P_0$ can have may be six values of $\{0, 2, 4, 6, 8, 10\}$, and a subjective speech quality prediction value $S_0$ and a perceptual-objective speech quality measurement value $O_0$ may each also have six values.

The second parameter $P_1$ may have values of 1 to 5, and a unit of each value may be 1. Therefore, values that the parameter $P_1$ can have may be five values of $\{1, 2, 3, 4, 5\}$, and a subjective speech quality prediction value $S_1$ and a perceptual-objective speech quality measurement value $O_1$ may each also have five values.

The M-th parameter $P_{M-1}$ may have values of 2 to 10, and a unit of each value may be 4. Therefore, values that the parameter $P_{M-1}$ can have may be three values of $\{2, 6, 10\}$, and a subjective speech quality prediction value $S_{M-1}$ and a perceptual-objective speech quality measurement value $O_{M-1}$ may each also have three values.

A subjective speech quality prediction value may be an index resulting from digitizing subjective speech quality according to a variation range of each parameter, and the subjective speech quality prediction value may be acquired by applying a weight w_j to importance for each parameter. At this time, a mean value of the entire weights may be 1.

A perceptual-objective speech quality prediction value may correspond to an actually measured value of a test voice signal for each combination of parameters in a real-time noise environment.

According to an embodiment of the disclosure, a subjective speech quality prediction value and an objective speech quality measurement value may be used to determine a combination of parameters for optimal speech quality. According to another embodiment of the present disclosure, a weight w_s for a subjective speech quality prediction value and a weight w_o for a perceptual-objective speech quality measurement value may be determined based on context information about a call, wherein a sum of w_s and w_o may be 1.

Speech quality B_i for an i-th parameter considering subjective speech quality, perceptual-objective speech quality, and context information may be represented by Equation 1, below.

$$B_i = w_o O_i + w_s \left( \frac{\sum_{j=0}^{M-1} (w_j S_j)}{M} \right), \text{ for } i = 0, \ldots, N-1, \quad \text{Equation 1}$$

where M represents a mean subjective speech quality prediction value for each parameter.

The speech quality enhancement method according to an embodiment of the present disclosure may determine, as an optimal combination of speech quality enhancement parameters, a combination of parameters for which speech quality B_i to which weights have been applied becomes maximum in a noise environment.

Figure 12:
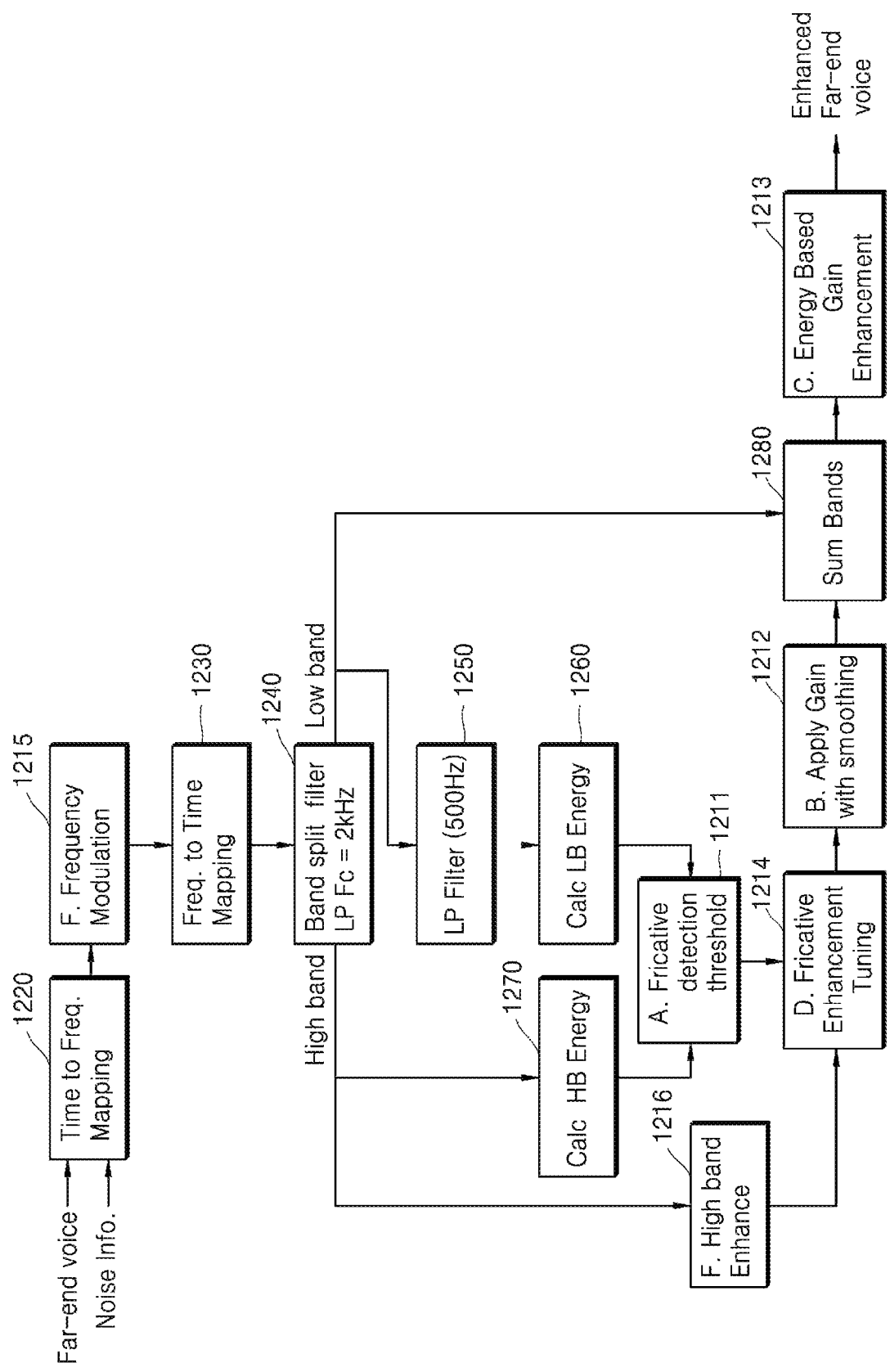
FIG. 12 is a block diagram of a speech quality enhancement method according to an embodiment of the present disclosure.

FIG. 12 is a block diagram of a speech quality enhancement method according to an embodiment of the present disclosure.

In the embodiment disclosed in FIG. 12, when a far-end voice signal and a near-end noise signal are acquired, time-frequency mapping of the input signals may be performed in operation 1220 for frequency modulation in operation 1215. Then, frequency modulation may be performed according to a determined frequency modulation index, in operation 1215, and frequency-time mapping may be again performed, in operation 1230. The frequency-modulated signals may be subject to band split filtering, in operation 1240, for processing per frequency band, and split to a high-frequency band signal and a low-frequency band signal.

After energy E_HB 1270 of the split high-frequency band signal and energy E_LB 1260 of the low-frequency band signal subject to low-pass filtering in operation 1250 are acquired, a ratio of E_LB and E_HB may be compared with a fricative detection threshold value, in operation 1211, to detect a fricative. Then, fricative reinforcement tuning may be performed on a signal whose high-frequency band has been reinforced in operation 1216, in operation 1214. A case in which a signal is determined as a fricative may correspond to a case in which the energy of the high-frequency band signal is relatively significantly greater than energy of the low-frequency band signal.

A smoothing gain may be applied in a predetermined frame size to the high-frequency signal subject to the fricative reinforcement tuning, in operation 1212, and then added with the low-frequency band signal subject to band splitting, in operation 1280. Thereafter, energy-based gain reinforcement may be performed in operation 1213 so that a far-end voice signal with enhanced speech quality may be finally acquired.

In FIG. 12, five speech quality enhancement methods and six parameters are disclosed, and the disclosed parameters and ranges of the parameters are as follows.

A 1211: fricative detection threshold value (thr)—1 to 5
B 1212: frame size to which the smoothing gain is applied—2 to 10 frames
C 1213: energy-based gain reinforcement
D 1214: fricative reinforcement tuning (15 taps): 5 to 30
E 1215: frequency modulation
F 1216: high-frequency reinforcement gain—1 to 3

According to an embodiment of the present disclosure, some speech quality enhancement methods among the five speech quality enhancement methods may be selected. According to another embodiment of the present disclosure, some parameters among the six parameters may be variably determined.

Figure 13:
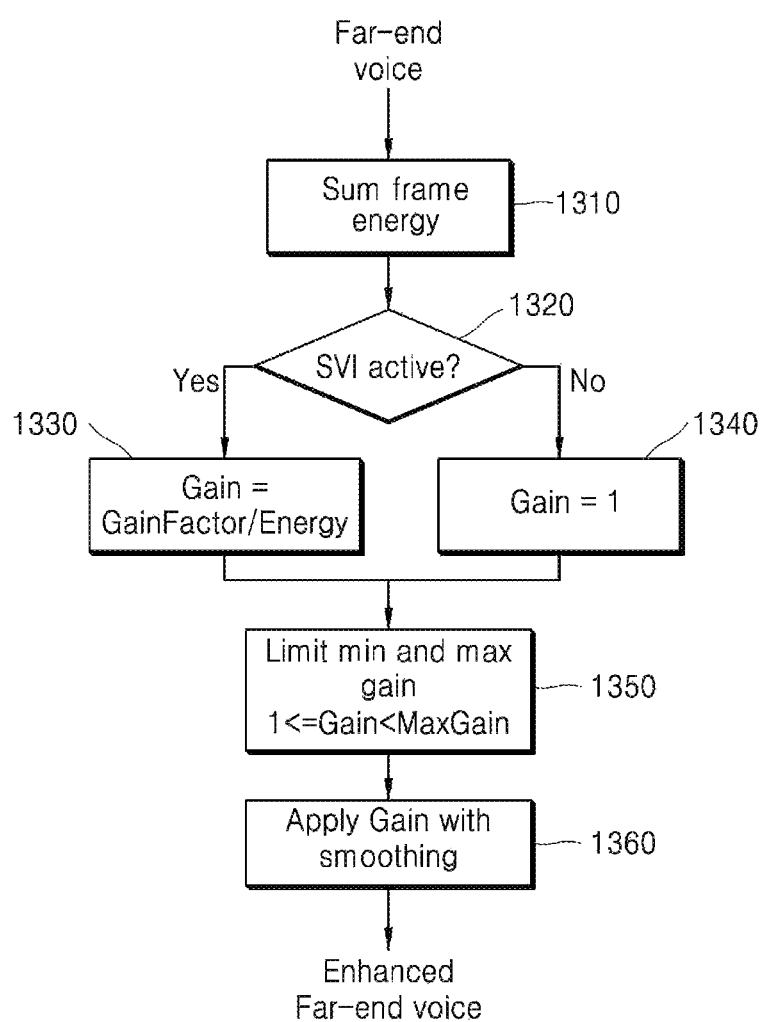
FIG. 13 is a block diagram of a speech quality enhancement method according to an embodiment of the present disclosure.

FIG. 13 is a block diagram of a speech quality enhancement method according to another embodiment of the present disclosure.

In FIG. 13, an energy-based gain enhancement method and a smoothing gain method for increasing energy of a quiet frame to enhance speech quality are disclosed, and details about the methods are as follows.

When a far-end voice signal is acquired, frame energy may be calculated in operation 1310, and a gain for a voice signal without noise (1320, SVI→active=0) may be determined as 1, in operation 1340. When SVI is active in operation 1320, a gain may be determined based on a ratio of a gain factor and energy, in operation 1330. By setting a maximum gain value and a minimum gain value in operation 1350, a gain may be prevented from deviating from a predetermined range. The minimum gain value may be set to 1 in order to prevent a signal from attenuating more than needs, and when a determined gain is smaller than 1, the gain may be set to 1. When a gain determined as a threshold value for preventing signal distortion is greater than the maximum gain value, the gain may be determined as the maximum gain value. After a gain is determined, a smoothing gain may be applied in unit of a predetermined frame by using a rolling average of the determined gain, in operation 1360.

Figure 14:
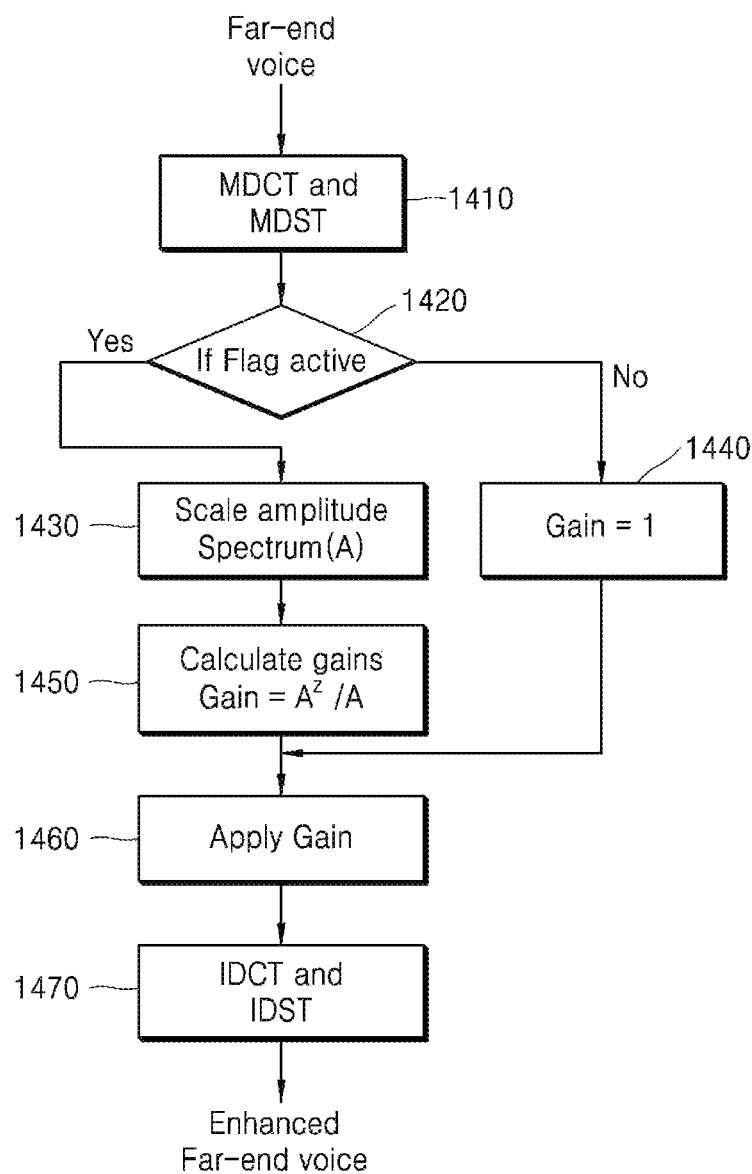
FIG. 14 is a block diagram of a speech quality enhancement method according to an embodiment of the present disclosure.

FIG. 14 is a block diagram of a speech quality enhancement method according to another embodiment of the present disclosure.

In FIG. 14, a method of compressing an amplitude spectrum through frequency modulation and increasing energy of a quiet band to thereby enhance speech quality is disclosed, and details about the method are as follows.

When a far-end voice signal is acquired, discrete cosine transform and discrete sine transform may be performed, in operation 1410, to convert a time-domain signal into a frequency-domain signal. Then, whether a flag for the corresponding frame is active may be determined, in operation 1420. When the flag is inactive, a gain may be set to 1, in operation 1440, and inverse-discrete cosine transform and inverse-discrete sine transform may be performed, in operation 1470, to output an original time-domain voice signal.

When the flag is active, an amplitude spectrum may be scaled and compressed to prevent a signal with a small amplitude from being distorted, in operation 1430. By dividing the compressed spectrum by an original spectrum, a gain may be acquired in operation 1450, and the acquired gain may be applied in operation 1460. A signal to which the gain has been applied may be subject to inverse-discrete cosine transform and inverse-discrete sine transform in operation 1470 to be transformed into a time-domain signal and output.

Figure 15:
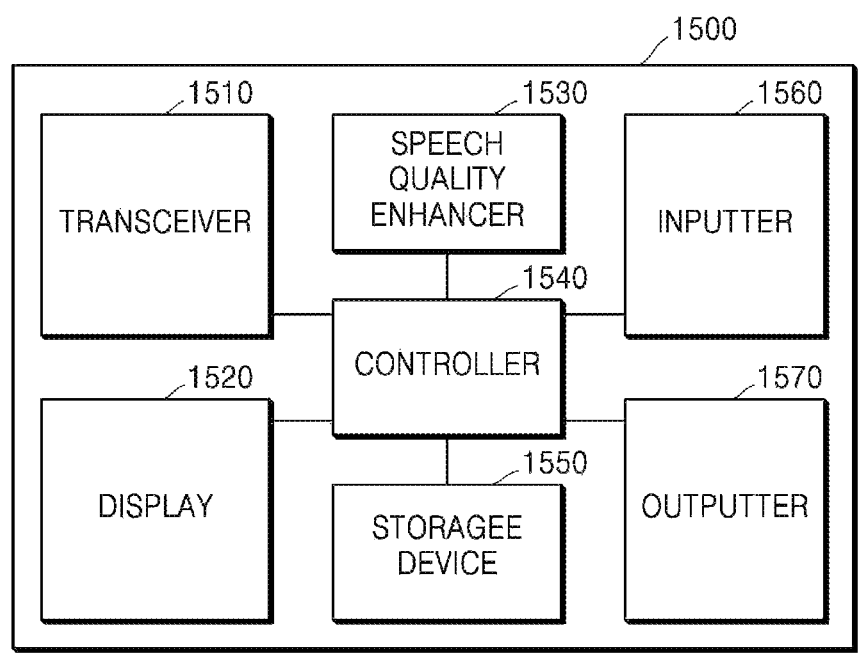
FIG. 15 is a detailed block diagram of a signal processing apparatus according to an embodiment of the present disclosure.

FIG. 15 is a block diagram of a signal processing apparatus according to an embodiment of the present disclosure.

As shown in FIG. 15, a signal processing apparatus 1500 according to an embodiment of the present disclosure may include a transceiver 1510, a display 1520, a speech quality enhancer 1530, a controller 1540, a storage device 1550, an inputter 1560, and an outputter 1570.

The transceiver 1510 may transmit/receive data to/from another terminal connected through a network, receive a requested incoming call signal and a far-end voice signal according to the incoming call from a far-end terminal (not shown), and transmit a near-end voice signal of a near-end noise signal environment acquired through the inputter 1560 to the far-end terminal.

According to an embodiment, the transceiver 1510 may transmit information about the near-end noise signal acquired through the inputter 1560 to a speech quality enhancement server (not shown), and receive information about an optimal speech quality enhancement method and an optimal speech quality enhancement parameter from the speech quality enhancement server. According to another embodiment, the transceiver 1510 may receive a far-end voice signal subject to speech quality enhancement pre-processing from the far-end terminal (not shown).

The display 1520 may provide information about a state or settings of the signal processing apparatus to a user, and acquire a user input through means such as a touch. According to an embodiment, the display 1520 may acquire feedback information for speech quality enhancement performance from the user. According to another embodiment, the display 1520 may acquire context information about a call through a user input.

The speech quality enhancer 1530 may acquire a subjective speech quality prediction value and an objective speech quality measurement value of a reference voice signal in a noise environment based on the reference voice signal stored in the storage device and the near-end noise signal acquired through the inputter 1560. The speech quality enhancer 1530 may select an optimal speech quality enhancement method and determine an optimal combination of speech quality enhancement parameter values, based on the acquired subjective speech quality prediction value and the acquired objective speech quality measurement value. The objective speech quality may include perceptual-objective speech quality such as POLQA, as well as objective speech quality, such as SNR or MSE.

According to an embodiment, context information for an incoming call may be additionally used, and a weight that is to be applied to the subjective speech quality prediction value and the objective speech quality measurement value may be determined based on the context information.

Also, the speech quality enhancer 1530 may enhance speech quality of the far-end voice signal based on the selected optimal speech quality enhancement method and the determined optimal combination of speech quality enhancement parameter values. According to an embodiment, the speech quality enhancer 1530 may monitor the acquired near-end noise signal, and when characteristics of the near-end noise signal change, the speech quality enhancer 1530 may determine new optimal speech quality enhancement parameter values in a new noise environment, and enhance speech quality of the near-end voice signal based on the new optimal speech quality enhancement parameter values.

The controller 1540 may control overall operations of the signal processing apparatus 1500. The controller 1540 and the speech quality enhancer 1530 may be implemented as a single processor.

The storage device 1550 may store a reference voice signal for speech quality measurement, and store a parameter setting value for speech quality enhancement. The stored parameter setting value may be used as a pre-set when a call starts according to an incoming call.

The inputter 1560 may acquire a near-end noise signal and a near-end voice signal, and may be implemented through a microphone. The number of inputters is not limited, and generally, the inputter 1560 may be positioned around a user's mouth and ear.

The outputter 1570 may output the far-end voice signal subject to speech quality enhancement and may be implemented through a speaker. According to an embodiment, the outputter 1570 may output an inverse-phase signal of the acquired near-end noise signal, and in this case, dynamic noise removal may be possible.

Figure 16:
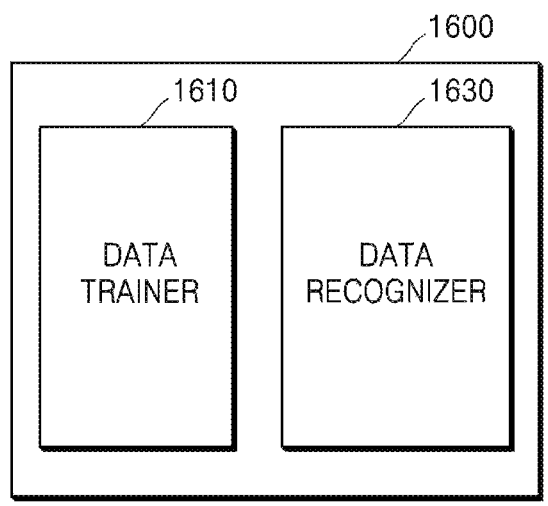
FIG. 16 is a block diagram of a processor according to an embodiment of the present disclosure.

FIG. 16 is a block diagram of a processor according to an embodiment of the present disclosure.

Referring to FIG. 16, a processor 1600 according to some embodiments may include a data trainer 1610 and a data recognizer 1630.

The data trainer 1610 may train criterion for determining an application algorithm and a parameter. The data trainer 1610 may train criterion about what data is to be used for determining a predetermined situation and how to determine a situation by using data. The data trainer 1610 may acquire data that is to be used for training, and apply the acquired data to a data recognition model which will be described later to thereby train criterion for determining a situation.

The data recognizer 1630 may determine a situation based on the data. The data recognizer 1630 may recognize a situation from predetermined data by using a trained data recognition model. The data recognizer 1630 may acquire predetermined data according to criterion pre-set by training, and use a data recognition model using the acquired data as an input value to determine a predetermined situation based on the predetermined data. Also, a result value output by the data recognition model using the acquired data as an input value may be used to update the data recognition model.

At least one of the data trainer 1610 and the data recognizer 1630 may be manufactured in the form of at least one hardware chip and mounted on an electronic apparatus. For example, at least one of the data trainer 1610 and the data recognizer 1630 may be manufactured in the form of a dedicated hardware chip for machine learning, or as a part of an existing general-purpose processor (for example, CPU or application processor) or a graphic dedicated processor (for example, GPU) and mounted on various electronic apparatuses.

In this case, the data trainer 1610 and the data recognizer 1630 may be mounted on a single electronic apparatus or separate electronic apparatuses. For example, one of the data trainer 1610 and the data recognizer 1630 may be included in an electronic apparatus, and the other one may be included in a server. Also, the data trainer 1610 and the data recognizer 1630 may provide model information established by the data trainer 1610 in a wired or wireless fashion to the data recognizer 1630. Data input to the data recognizer 1630 may be provided as additional training data to the data trainer 1610.

Meanwhile, at least one of the data trainer 1610 and the data recognizer 1630 may be implemented as a software module. When at least one of the data trainer 1610 and the data recognizer 1630 is implemented as a software module (or a program module including instructions), the software module may be stored in a non-transitory computer readable media. Also, in this case, at least one software module may be provided by operating system (OS) or by a predetermined application. Also, a part of the at least one software module may be provided by OS, and the other part may be provided by a predetermined application.

Figure 17:
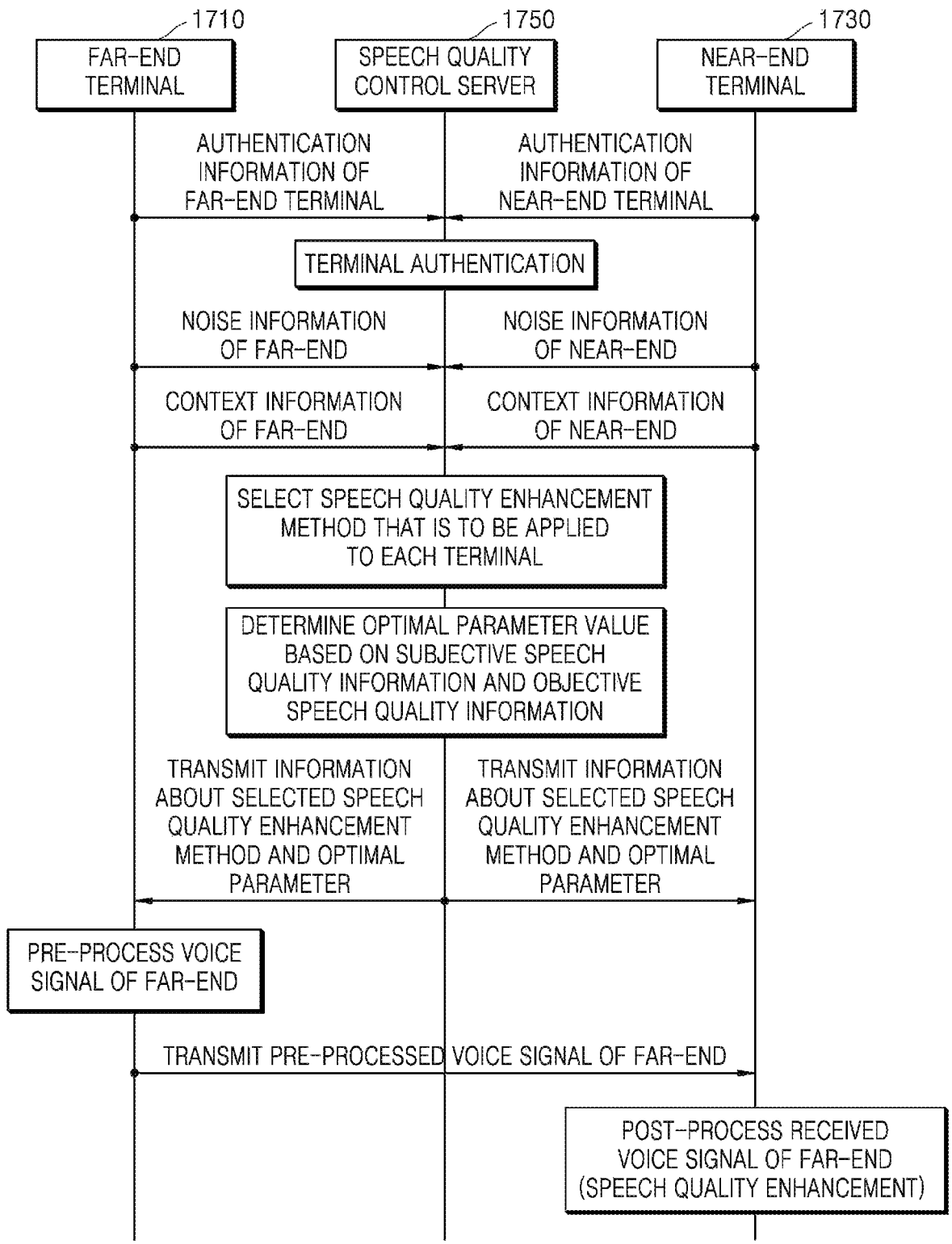
FIG. 17 is a detailed flowchart for describing operations between Tx and Rx terminals and a server, according to an embodiment of the present disclosure

FIG. 17 is a detailed flowchart for describing operations between transmitting (Tx) and receiving (Rx) terminals and a server, according to an embodiment of the present disclosure.

The speech quality enhancement technique described above may be implemented such that a far-end terminal and a near-end terminal select an optimal parameter for speech quality enhancement and perform pre-processing and post-processing for speech quality enhancement. In this case, the far-end terminal and the near-end terminal may select a parameter for a speech quality enhancement method that can be provided by the terminals, and provide best-effort speech quality in a small terminal level.

However, in the case of a small terminal, capacity of a storage device, performance of a processor, a battery level, etc. are limited, and due resources, the small terminal can mount a limited number of speech quality enhancement algorithms thereon.

In this case, because speech quality is enhanced by using an algorithm created for general users, speech quality enhancement performance adaptive to a user of a terminal may be not guaranteed, and because speech quality is enhanced by using an algorithm created for specific noise, optimal speech quality enhancement performance for a different type of noise may also be not guaranteed.

Also, when complex operations need to be performed, system delays or loads may be caused. Therefore, mountable algorithms are limited, and also, when environment information not considered, for example, a new type of noise is received upon mounting an algorithm, optimal speech quality enhancement performance may be not guaranteed.

Accordingly, complex processes that cannot be processed by a low-power small terminal may be performed by a server, and the result of the performance may be transferred to the terminal to cause the terminal to use the result for speech quality enhancement, thereby more effectively enhancing speech quality.

However, when the performance of a terminal is improved to rapidly perform processing and reduce a limitation in power consumption, the terminal may be implemented to perform the functions without a server, thereby effectively enhancing speech quality.

The embodiment of FIG. 17 may include a far-end terminal 1710, a near-end terminal 1730, and a speech quality control server 1750. The far-end terminal 1710 may correspond to a transmitting terminal 1710 of FIG. 18 and the near-end terminal 1730 may correspond to a receiving terminal 1730 of FIG. 18.

The far-end terminal 1710 and the near-end terminal 1730 may each transmit its own authentication information to the speech quality control server 1750. The speech quality control server 1750 that has received the authentication information may determine whether each terminal has been registered therein by using the received authentication information. According to an embodiment of the present disclosure, the speech quality control server 1750 may acquire speech quality enhancement methods that are executable on the corresponding terminals, by using the authentication information of the terminals 1710 and 1730. According to another embodiment, the speech quality control server 1750 may acquire speech quality enhancement methods that are executable on the corresponding terminals, by using information about models of the terminals 1710 and 1730.

When authentication of the far-end terminal 1710 and the near-end terminal 1730 is completed by the speech quality enhancement server 1750, the far-end terminal 1710 may transmit far-end noise information to the speech quality control server 1750, and the near-end terminal 1730 may transmit near-end noise information to the speech quality control server 1750.

The speech quality control server 1750 may select a speech quality enhancement method that is to be applied to the far-end terminal 1710 based on the received far-end noise information, and determine an optimal parameter value for the selected method based on subjective speech quality evaluation information and objective speech quality evaluation information. Also, the speech quality control server 1750 may select a speech quality enhancement method that is to be applied to the near-end terminal 1730 based on the received near-end noise information, and determine an optimal parameter value for the selected method based on subjective speech quality evaluation information and objective speech quality evaluation information.

According to another embodiment, the far-end terminal 1710 and the near-end terminal 1730 may transmit context information about a call of each terminal, in addition to noise information, to the speech quality control server 1750, and the speech quality control server 1750 may determine an optimal parameter value by additionally using the context information about the call.

For example, when an emergency call or a disaster call is made, subjective speech quality, that is, voice articulation becomes a more important factor in speech quality, rather than objective speech quality. Accordingly, by applying a weight to enhance articulation although objective speech quality deteriorates more or less, an optimal parameter may be selected. According to another embodiment, an optimal parameter value may be determined according to a call environment, such as whether a call environment is a 3G network or a 4G network, whether an encoded voice signal is a mono signal or a stereo signal, whether the call is a call to which VR, AR, or MR has been applied, etc.

For example, by setting a noise removal algorithm and a parameter based on noise information around a service providing terminal with respect to a voice signal or an audio signal transmitted from a server for providing a VR or AR service, the speech quality enhancement method according to the present disclosure may be applied.

After a speech quality enhancement method that is to be applied to each terminal is selected and an optimal parameter for speech quality enhancement is determined, the speech quality control server 1750 may transmit information about the selected speech quality enhancement method and information about the determined optimal parameter to the terminal. According to an embodiment, a pre-processing process may include noise suppression or echo cancelling.

The far-end terminal 1710 may perform pre-processing on the far-end voice signal based on the information about the speech quality enhancement method and the information about the determined optimal parameter, received from the speech quality control server 1750, to enhance speech quality, and transmit the far-end voice signal with the enhanced speech quality to the near-end terminal 1730.

The near-end terminal 1730 may perform post-processing on the far-end voice signal received from the far-end terminal 1710, based on the information about the speech quality enhancement method and the information about the determined optimal parameter, received from the speech quality control server 1750, to enhance speech quality of the far-end voice signal. According to an embodiment, the post-processing process may include articulation enhancement or dynamic voice enhancement (DyVE).

According to another embodiment, the following methods may be used additionally to acquire speech quality enhancement performance adaptive to a user of the far-end or near-end terminal.

Through user settings or informed consent, information about noise around a user may be collected even when no call is made, and based on the collected information about the noise, priority may be assigned to a speech quality enhancement method that is effective for a noise environment to which the user is often exposed or a higher weight may be assigned to a parameter for enhancing the corresponding noise environment, thereby enhancing speech quality enhancement performance.

Also, by analysing voice content to acquire context information or collecting feedbacks through an ex-post survey after a call ends, speech quality enhancement performance may be enhanced.

Figure 18:
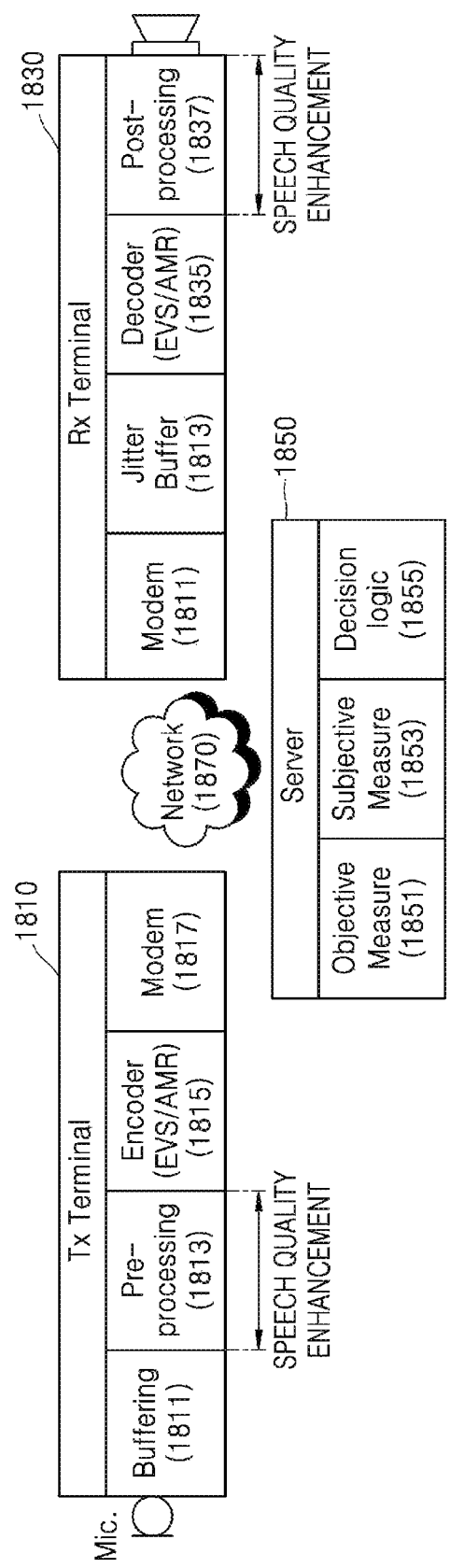
FIG. 18 shows a structure of Tx and Rx terminals, a server, and a network, according to an embodiment of the present disclosure.

FIG. 18 shows a structure of Tx and Rx terminals, a server, and a network, according to an embodiment of the present disclosure.

FIG. 18 shows a structure of Tx and Rx terminals, a server, and a network, according to an embodiment, wherein a Tx terminal 1810 corresponds to a far-end terminal, and a Rx terminal 1830 corresponds to a near-end terminal. A speech quality enhancement system according to an embodiment disclosed in FIG. 18 may include the Tx and Rx terminals 1810 and 1830 and a speech quality enhancement server 1850 connected to the Tx and Rx terminals through a network 1870.

The network 1870 may function to connect the Tx terminal 1810, the Rx terminal 1830, and the speech quality enhancement server 1850 to each other. The network 1870 may include a private line, LAN, VAN, intranet, a private telephone network, a public telephone network, a PSTN network, and a combination thereof. The network 1870 may be a data communication network of a comprehensive meaning to enable network configuration elements shown in FIG. 18 to stably communicate with each other, and the network 1870 may include the wired internet, the wireless internet, a mobile wireless communication network, etc.

The Tx terminal 1810 and the Rx terminal 1830 may be the far-end terminal and the near-end terminal disclosed in FIG. 1, and may use a packet network structure.

When a call negotiation is completed and a far-end noise signal and a far-end voice signal are input to the Tx terminal 1810, the Tx terminal 1810 may transfer information about the far-end noise to the speech quality enhancement server 1850.

When a call negotiation is completed and a near-end noise signal is input to the Rx terminal 1830, the Rx terminal 1830 may transfer information about the near-end noise to the speech quality enhancement server 1850.

According to another embodiment, the Tx terminal 1810 or the Rx terminal 1830 may transfer context information for its call additionally to the speech quality enhancement server 1850.

The speech quality enhancement server 1850 may determine an algorithm which the Tx terminal 1810 will apply to a pre-processor 1811 for enhancing speech quality of the far-end voice signal and an optimal parameter value for the corresponding algorithm, based on the information about the far-end noise received from the Tx terminal 1810.

Also, the speech quality enhancement server 1850 may select an algorithm which the Rx terminal 1830 will apply to a post-processor 1831 for enhancing speech quality of a far-end voice signal, and determine an optimal parameter value for the corresponding algorithm, based on the information about the near-end noise received from the Rx terminal 1830.

The speech quality enhancement server 1850 may include an objective speech quality measurer 1851, a subjective speech quality measurer 1853, and a determiner 1855. Hereinafter, detailed operations of the individual components of the speech quality enhancement server 1850 will be described.

The subjective speech quality measurer 1853 may simulate subjective speech quality according to a range of parameters for each algorithm based on characteristics of a background noise signal, and input the parameter values to the objective speech quality measurer. Algorithms used for the simulation may correspond to algorithms that are executable on the Tx terminal 1810 and the Rx terminal 1830.

The objective speech quality measurer 1851 may measure objective speech quality by using pre-stored test database or a voice signal transferred from the Tx terminal 1810 and information input from the subjective speech quality measurer 1853.

The determiner 1855 may determine an optimal parameter for speech quality enhancement based on a result of the objective speech quality measurement and a result of the subjective speech quality measurement. According to another embodiment of the present disclosure, context information about a call may be used additionally to determine an optimal parameter. The determiner may be implemented by using a machine learning method.

After the algorithm that is to be applied to the pre-processor 1811 of the Tx terminal 1810 and the optimal parameter value for the corresponding algorithm are determined, the speech quality enhancement server 1850 may transmit information about the determined algorithm and information about the parameter value to the Tx terminal 1810.

The Tx terminal 1810 may perform pre-processing by using the information about the algorithm and the information about the parameter value transmitted from the speech quality enhancement server 1850 to enhance speech quality of the received far-end voice signal. According to an embodiment, the pre-processing may include noise suppression and echo cancelling. The Tx terminal 1810 may transmit the far-end voice whose speech quality has been enhanced through the pre-processing to the Rx terminal 1830.

Also, after the algorithm that is to be applied to the post-processor 1831 of the Rx terminal 1830 and the optimal parameter value for the corresponding algorithm are determined, the speech quality enhancement server 1850 may transmit information about the determined algorithm and information about the parameter value to the Rx terminal 1830.

The Rx terminal 1830 may perform post-processing by using the information about the algorithm and the information about the parameter value transmitted from the speech quality enhancement server 1850 to enhance speech quality of the far-end voice signal received from the Tx terminal 1810. According to an embodiment, the post-processing may include articulation enhancement or DyVE.

The Tx terminal 1810, the Rx terminal 1830, and the speech quality control server 1850 may further include a communicator, a controller, a storage device, a processor, a display, and a user inputter, which are not shown.

An articulation enhancement method according to an embodiment of the present disclosure may apply an articulation enhancement technique based on noise physically reduced by a noise control technique, instead of merging a near-end voice signal to which a noise reduction technique has been applied with a far-end voice signal to which an articulation enhancement technique has been applied, thereby enhancing objective speech quality as well as subjective speech quality.

The embodiments according to the present disclosure as described above may be implemented in a program command form that can be executed by various computer components, and may be recorded on computer-readable recording media. The computer-readable recording media may also include, alone or in combination with program commands, data files, data structures, and the like. Program commands recorded in the computer-readable recording media may be the kind specifically designed and constructed for the purposes of the present disclosure or well-known and available to those of ordinary skill in the computer software field. Examples of the computer-readable recording media include magnetic media, such as hard disks, floppy disks, and magnetic tapes, optical media, such as CD-ROM and DVD, magneto-optical media such as floptical disks, and hardware devices, such as ROM, RAM, flash memory, and the like, specifically configured to store and execute program commands. Examples of the program commands include high-level language codes that can be executed on a computer through an interpreter or the like, as well as machine language codes produced by a compiler. The hardware devices may change to one or more software modules in order to perform processing according to the present disclosure, and vice versa.

The present disclosure has been described by specific matters such as detailed components, limited embodiments, and drawings, however, these have been provided to help overall understanding of the present disclosure. Therefore, the present disclosure is not limited to the above-described embodiments, and it will be apparent to those of ordinary skill in the art that various modifications and variations can be made from the above description.

Thus, the concept of the present disclosure is not limited to the above-described embodiments, and it is intended that the disclosure covers the modifications and variations of this disclosure provided they come within the scope of the appended claims and their equivalents.

The invention claimed is:

1. A voice signal processing method comprising:
acquiring a real-time near-end noise signal;
acquiring a far-end voice signal according to an incoming call;
measuring subjective speech quality and perceptual-objective speech quality of test signals generated based on a reference signal and the real-time near-end noise signal;
selecting at least one speech quality enhancement method based on the subjective speech quality and the perceptual-objective speech quality; and determining parameters that are to be applied to the selected at least one speech quality enhancement method; and
enhancing speech quality of the far-end voice signal by using the selected at least one speech quality enhancement method, based on the determined parameters,
wherein the test signals are generated by mixing the acquired real-time near-end noise signal with the reference signal whose speech quality is enhanced by applying a combination of parameter values to speech quality enhancement methods.

2. The voice signal processing method of claim 1, wherein determining of the parameters comprises:
measuring speech quality of the test signals based on the subjective speech quality and the perceptual-objective speech quality; and
determining a combination of parameter values when the measured speech quality of the test signals is optimal, as the parameters.

3. The voice signal processing method of claim 2, wherein the determining of the parameters further comprises
determining a weight for the subjective speech quality and a weight for the perceptual-objective speech quality based on context information for the incoming call,
wherein the speech quality of the test signals is measured by applying the weight for the subjective speech quality to the subjective speech quality and applying the weight for the perceptual-objective speech quality to objective speech quality.

4. The voice signal processing method of claim 1, wherein the subjective speech quality is measured based on subjective speech quality prediction values corresponding to the parameter values.

5. The voice signal processing method of claim 1, further comprising:
monitoring the real-time near-end noise signal; and
updating the parameters when a result of monitoring the real-time near-end noise signal indicates that characteristics of the real-time near-end noise signal change.

6. A voice signal processing method comprising:
acquiring a real-time near-end noise signal;
acquiring a far-end voice signal according to an incoming call;
transmitting information about the acquired real-time near-end noise signal;
receiving information about at least one speech quality enhancement method selected based on subjective speech quality and perceptual-objective speech quality of test signals generated based on a reference signal and the real-time near-end noise signal, and information about optimal values of parameters that are to be applied to the selected at least one speech quality enhancement method; and
enhancing speech quality of the far-end voice signal by using the selected at least one speech quality enhancement method; based on the received optimal values of the parameters,
wherein the test signals are generated by mixing the acquired real-time near-end noise signal with the reference signal whose speech quality is enhanced by applying a combination of parameter values to speech quality enhancement methods.

7. The voice signal processing method of claim 6, wherein the far-end voice signal is a voice signal whose speech quality is enhanced by applying optimal values of parameters determined based on a reference signal and a real-time far-end noise signal to at least one speech quality enhancement method.

8. A voice signal processing apparatus comprising:
an inputter configured to acquire a real-time near-end noise signal;
a receiver configured to acquire a far-end voice signal according to an incoming call; and
a speech quality enhancer configured to measure subjective speech quality and perceptual-objective speech quality of test signals generated based on a reference signal and the real-time near-end noise signal, to select at least one speech quality enhancement method based on the subjective speech quality and the perceptual-objective speech quality, to determine parameters that are to be applied to the selected at least one speech quality enhancement method, and to enhance speech quality of the far-end voice signal by using the selected at least one speech quality enhancement method, based on the determined parameters,
wherein the test signals are generated by mixing the acquired real-time near-end noise signal with the reference signal whose speech quality is enhanced by applying a combination of parameter values to speech quality enhancement methods.

9. The voice signal processing apparatus of claim 8, wherein the speech quality enhancer measures speech quality of the test signals based on the subjective speech quality and the perceptual-objective speech quality, and determines a combination of parameter values when the measured speech quality of the test signals is optimal, as the parameters.

10. The voice signal processing apparatus of claim 9, wherein the speech quality enhancer measures the speech quality of the test signals by determining a weight for the subjective speech quality and a weight for the perceptual-objective speech quality based on context information for the incoming call, applying the weight for the subjective speech quality to the subjective speech quality and applying the weight for the perceptual-objective speech quality to objective speech quality.

11. The voice signal processing apparatus of claim 8, wherein the subjective speech quality is measured based on subjective speech quality prediction values corresponding to the parameter values.

12. The voice signal processing apparatus of claim 8, wherein the speech quality enhancer monitors the real-time near-end noise signal, and updates the parameters when a result of monitoring the real-time near-end noise signal indicates that characteristics of the real-time near-end noise signal change.

13. A non-transitory computer-readable recording medium having recorded thereon a program that when executed by a processor, causes the processor to:
  acquire a real-time near-end noise signal;
  acquire a far-end voice signal according to an incoming call;
  measure subjective speech quality and perceptual-objective speech quality of test signals generated based on a reference signal and the real-time near-end noise signal;
  select at least one speech quality enhancement method based on the subjective speech quality and the perceptual-objective speech quality;
  determine parameters that are to be applied to the selected at least one speech quality enhancement method; and
  enhance speech quality of the far-end voice signal by using the selected at least one speech quality enhancement method, based on the determined parameters,
  wherein the test signals are generated by mixing the acquired real-time near-end noise signal with the reference signal whose speech quality is enhanced by applying a combination of parameter values to speech quality enhancement methods.

* * * * *